US012419369B2

(12) United States Patent
Ylitalo et al.

(10) Patent No.: US 12,419,369 B2
(45) Date of Patent: Sep. 23, 2025

(54) SYSTEMS AND METHODS FOR IMPROVED RESPIRATORY PROTECTION DEVICES

(71) Applicant: 3M INNOVATIVE PROPERTIES COMPANY, St. Paul, MN (US)

(72) Inventors: Caroline M. Ylitalo, Stilwater, MN (US); Marie D. Manner, St. Paul, MN (US); Kevin W. Gotrik, Hudson, WI (US); Matthew T. Scholz, Woodbury, MN (US); Gina M. Daveloose, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 38 days.

(21) Appl. No.: 18/558,567

(22) PCT Filed: Apr. 28, 2022

(86) PCT No.: PCT/US2022/026641
§ 371 (c)(1),
(2) Date: Nov. 2, 2023

(87) PCT Pub. No.: WO2022/235472
PCT Pub. Date: Nov. 10, 2022

(65) Prior Publication Data

US 2024/0215664 A1 Jul. 4, 2024

Related U.S. Application Data

(60) Provisional application No. 63/201,604, filed on May 6, 2021.

(51) Int. Cl.
*A41D 13/11* (2006.01)
*A62B 23/02* (2006.01)

(52) U.S. Cl.
CPC ...... *A41D 13/1161* (2013.01); *A41D 13/1138* (2013.01); *A62B 23/025* (2013.01)

(58) Field of Classification Search
CPC ............ A41D 13/1161; A41D 13/1138; A62B 23/025
See application file for complete search history.

(56) References Cited

U.S. PATENT DOCUMENTS 2,957,207 A 10/1960 Roop et al.
4,037,593 A 7/1977 Tate, Jr.
(Continued)

FOREIGN PATENT DOCUMENTS

KR 10-2028698 B1 10/2019
WO 2008051726 A1 5/2008
(Continued)

OTHER PUBLICATIONS

Chen, "New Respirator Fit Test Panels Representing the Current Chinese Civilian Workers", The Annals of Occupational Hygiene, Feb. 2009, vol. 53, No. 3, pp. 297-305 . . .
(Continued)

*Primary Examiner* — Gloria M Hale
(74) *Attorney, Agent, or Firm* — Jonathan V. Sry

(57) ABSTRACT

A nose foam for a respiratory protection device is presented that includes a first check portion, a second check portion, and a nose bridge portion. The first and second check portions are both wider than the nose bridge portion. The nose foam is selected for the respiratory protection device by a computer-based respiratory protection device selection system, based on a facial feature of a wearer.

20 Claims, 25 Drawing Sheets

(56) References Cited

U.S. PATENT DOCUMENTS

| | | | | |
|---|---|---|---|---|
| 4,158,087 | A | 6/1979 | Wood | |
| 4,384,577 | A | 5/1983 | Huber et al. | |
| 4,888,225 | A | 12/1989 | Sandvig et al. | |
| 5,188,123 | A | 2/1993 | Gardner, Jr. | |
| 5,203,352 | A | 4/1993 | Gardner, Jr. | |
| 5,423,735 | A | 6/1995 | Callinan et al. | |
| 5,593,628 | A | 1/1997 | Scholz et al. | |
| 5,650,450 | A | 7/1997 | Lovette et al. | |
| 6,125,845 | A | 10/2000 | Halvorsen et al. | |
| 6,923,182 | B2 * | 8/2005 | Angadjivand ..... | A41D 13/1146 128/206.16 |
| 7,086,401 | B2 * | 8/2006 | Chiam .................. | A41D 13/11 128/206.16 |
| 7,094,463 | B2 | 8/2006 | Haas et al. | |
| 7,285,576 | B2 | 10/2007 | Hyde et al. | |
| 7,475,686 | B2 | 1/2009 | Knauer et al. | |
| 7,904,193 | B2 | 3/2011 | Janbakhsh | |
| 7,958,653 | B2 | 6/2011 | Howlett et al. | |
| 8,679,607 | B2 | 3/2014 | Hamer et al. | |
| 2004/0011362 | A1 * | 1/2004 | Angadjivand ..... | A41D 13/1146 128/206.13 |
| 2006/0174890 | A1 | 8/2006 | Cheng | |
| 2008/0023006 | A1 * | 1/2008 | Kalatoor ................ | A41D 13/11 128/205.27 |
| 2008/0026173 | A1 * | 1/2008 | Angadjivand ..... | A41D 13/1146 428/221 |
| 2008/0099022 | A1 * | 5/2008 | Gebrewold .......... | A62B 23/025 128/206.24 |

FOREIGN PATENT DOCUMENTS

| | | | |
|---|---|---|---|
| WO | 2008082700 | A2 | 7/2008 |
| WO | 2016069342 | A1 | 5/2016 |
| WO | 2019155315 | A1 | 8/2019 |

OTHER PUBLICATIONS

International Search report for PCT International Application No. PCT/US2022/026641, mailed on Aug. 18, 2022, 7 pages.

Pin art description from Wikipedia, retrieved from internet on Jan. 2, 2024 (date unknown but believed to be prior to date of filing of the application), 2 Pages.

Product description from Amazon.sa of "Microfiber Memory Foam Anti-Fog Nose Bridge Pads Self-Adhesive Protection Strip Seal Nose Cushion Sponge Nose Bridge Pads", 4 Pages.

Product description of mask materials, retrieved from internet on Jan. 2, 2024 (date unknown but believed to be prior to date of filing of the application), 2 Pages.

Zhuang, "Digital 3-D headforms with facial features representative of the current US workforce", Ergonomics, May 2010, vol. 53, No. 5, pp. 661-671.

Zifchock, "A Comparison of Semi-Custom and Custom Foot Orthotic Devices in High- and Low-Arched Individuals During Walking", Clinical biomechanics, 2008, vol. 23, pp. 1287-1293.

* cited by examiner

FIG. 7A
700
702
Let's find you the
perfect mask
workpl
Safe
everyday
comfort

750

SYSTEMS AND METHODS FOR IMPROVED RESPIRATORY PROTECTION DEVICES

CROSS REFERENCE TO RELATED APPLICATIONS

This application is a national stage filing under 35 U.S.C. 371 of PCT/US2022/026641, filed Apr. 28, 2022, which claims the benefit of U.S. Provisional Application No. 63/201,604, filed May 6, 2021, the disclosure of which is incorporated by reference in its entirety herein.

BACKGROUND

As a commonly used protective article, a respiratory protection device is often used to protect against dust, mist, bacteria, etc., and is widely used in specific working environments and daily life. Respiratory protection devices and other face coverings are designed to provide a barrier to particulates and airborne or droplet-borne diseases, both by keeping exhalations from an infected individual contained and by providing a barrier from the coughs or exhalations of others. Respiratory protection devices have been required PPE for healthcare and many industrial environments for years, and have seen increasing use as COVID-19 has required their usage in public places globally.

SUMMARY

An objective of the present invention is to provide an improved seal between a respiratory protection device and the face of the user, so as to improve the wearing comfort as well as the sealing between the respiratory protection device and the face of a wearer.

A nose foam for a respiratory protection device is presented that includes a first cheek portion, a second cheek portion, and a nose bridge portion. The first and second cheek portions are both wider than the nose bridge portion. The nose foam is selected for the respiratory protection device by a computer-based respiratory protection device selection system, based on a facial feature of a wearer.

BRIEF DESCRIPTION OF THE DRAWINGS

The embodiments of the present invention are described below merely as examples with reference to the accompanying drawings. In the accompanying drawings, the same features or components are represented by the same reference numerals, and the accompanying drawings are not necessarily drawn to scale. Further, in the accompanying drawings.

DETAILED DESCRIPTION

Figure 1:
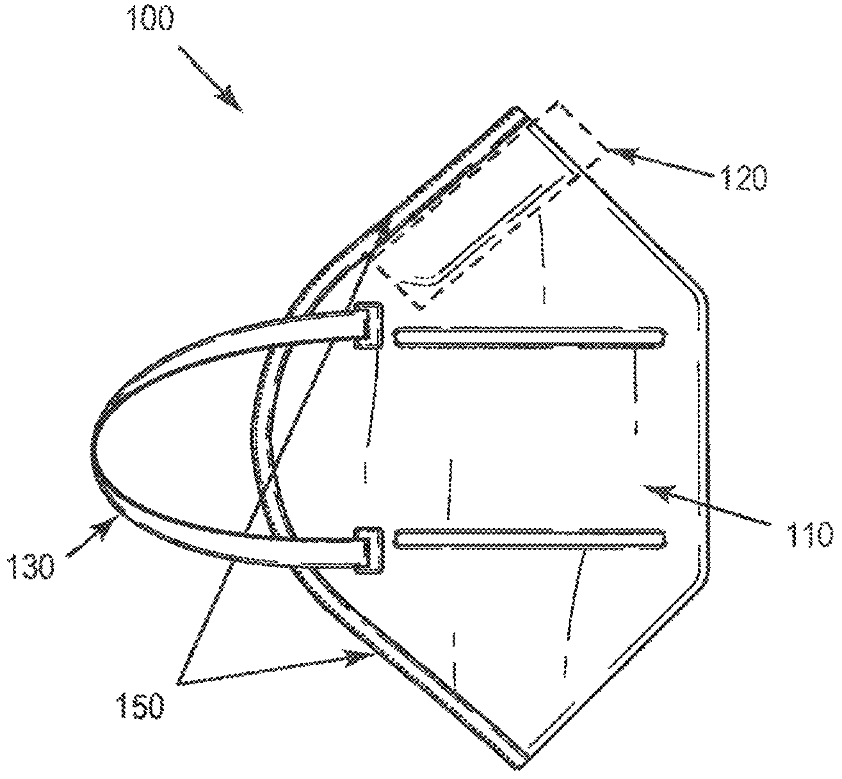
FIG. 1 is a view of a respirator.

The following descriptions are substantially merely exemplary, and are not intended to limit the present invention, the application, and the use. It should be understood that in all of the accompanying drawings, similar reference numerals represent the same or similar parts and features. The accompanying drawings illustratively show the idea and principles of the embodiments of the present invention, but do not necessarily show specific size of each embodiment of the present invention and the scale thereof. In some parts of specific accompanying drawings, related details or structures of the embodiments of the present invention may be illustrated in an exaggerated manner.

The use of personal protective equipment (PPE) has become an important part of the strategy to limit the spread of respiratory infections. Respiratory protection devices have become increasingly important globally as COVID-19 has spread. Two types of respiratory protection devices are in increasingly common use: filtering facepiece respirators (FFRs, referred to as "respirators" herein) and face masks (commonly called masks, often made of cloth). As used herein the term "respiratory protection devices" may refer to respirators, face masks, or other facial coverings.

The term "face mask" generally refers to a face covering that inhibits droplets from the wearer from spreading, e.g. from a cough or a sneeze. However, face masks often provide little or no protection against droplets from another individual. FFRs, in contrast, are designed to seal to a user's face, such that inhaled air is forced through one or more filter layers, such that most droplets, microbes, and particulates are removed from inhaled air before it reaches a wearer. Additionally, some FFRs include charged fibers that attract microbes or particulates, providing increased protection.

Filtering facepiece respirators (FFRs) are sometimes referred to as disposable respirators (DRs). When worn properly, FFRs are designed to protect the wearer by removing harmful particles from inhaled air. FFRs are regulated by the National Institute for Occupational Safety and Health (NIOSH). To provide the required level of protection, an FFR must seal to the wearer's face, preventing gaps between the respirator and the wearer's skin since such gaps can allow contaminated air to leak into the breathing zone of the wearer. Therefore, tight fit of the FFR to the face of the wearer is essential.

Face masks, on the other hand, are not specifically designed to protect the wearer from airborne hazards. These devices limit the spread of infectious particles expelled by the wearer such as those generated by coughs or sneezes. Face masks are typically loose fitting and may not form a good seal against the user's face. While respirators and face masks are very different in intended use, fit against the face, and regulatory approvals, both may benefit from systems and methods used herein.

This invention is particularly useful for respirator wearers, however, it is not intended to exclude other types of face covering such as facemasks. The invention will be described herein with reference to respirators. However, it should be understood that this invention is equally applicable to other face coverings such as face masks, surgical masks, procedure masks and the like.

Respiratory protection devices are mass produced with the goal of fitting many different facial structures, including male and female, high or low cheekbones, prominent jaws, etc. Additionally, respiratory protection devices are often worn during activity, such that the wearer may have different facial expressions during use, may walk or run, may sweat or laugh. Additionally, different types and different models of respiratory protection device may be worn at different facial positions for the same user, depending on usage or activity.

Ideally, when worn, a respiratory protection device should fit the contour of the face of a wearer to form good sealing between the respirator and the face of the wearer. However, the contour of the face of the wearer is not the same between individuals, and there can be large differences from individual to individual. The contour of the nose is complex and fluctuates: it is often difficult to form a good seal, and a gap is often present between the respiratory protection device and the nose area of the wearer, resulting in a poor sealing effect. As a result, dust, mist or bacteria, virus, fungi in an environment where the wearer is located will be in contact with the wearer through the gap and is inhaled by the wearer, thus affecting the protective effect of the respirator. Additionally, the exhaled breath of the wearer will also be discharged upwards through this gap. For the case where the wearer wears glasses, if the temperature in the respirator is higher than the ambient temperature, the exhaled breath will cause fogging and affect the wearing experience of the wearer.

Therefore, in order to improve the protective effect of a respiratory protection device and improve the wearing experience, it is expected that the respiratory protection device can fit the contour of the face of the wearer and achieve good sealing between the respiratory protection device and the face of the wearer. In an existing respiratory protection device, a metal or plastic nose strip with a memory effect is used. When this type of respiratory protection device is worn, by applying a pressure to this part of the respiratory protection device, the nose strip of the respiratory protection device is deformed to fit the contour of the nose of the wearer, so that the respiratory protection device is pressed against and fits the face of the wearer, thus improving the sealing between the respiratory protection device and the nose of the wearer. However, the pressure applied to the nose of the wearer by the nose strip of such a respiratory protection device is prone to cause discomfort to the wearer, and it is easy to cause indentation and even cause trauma on the face of the wearer. The situation is particularly obvious when the respiratory protection device is worn for a long time. For example, in an industrial setting a user may wear a respiratory protection device for one, two, four or even 8 hours while a clinician in a hospital may wear a respiratory protection device for an entire shift (8 hrs) or perhaps even a double shift (16 hrs). An improved option for sealing the respiratory protection device to a user's face is desired.

Described herein are systems and methods that may be useful for respiratory protection devices generally.

FIG. 1 is a view of a respirator. Respirator 100 is an earloop respirator. In the example shown in the drawing, respirator 100 is a foldable earloop respirator. However, the present invention is not limited thereto, and may also be applied to non-foldable or non-earloop respirators as well as to other face masks more broadly. In the manufacturing process of the first respirator 100, a formable nose piece (often metal, however other suitable materials are envisioned) is attached to an inner or outer side of a respirator main body 110, within area 120. When the first respirator 100 is worn, a lanyard 130 is hung on the left and right ears of the wearer, respectively.

It is intended that a user adjust respirator 100 so that the nose of the wearer is accommodated in by adjusting the formable nose piece such that area 120, and the exterior edge 150 conform to the contour of the face of the wearer to closely fit the periphery of the nose of the wearer, thus reducing or even eliminating the gap between the respirator and the nose of the wearer. A good seal between respirator 100 and the face of the wearer is important for safety concerns.

Figure 2B:
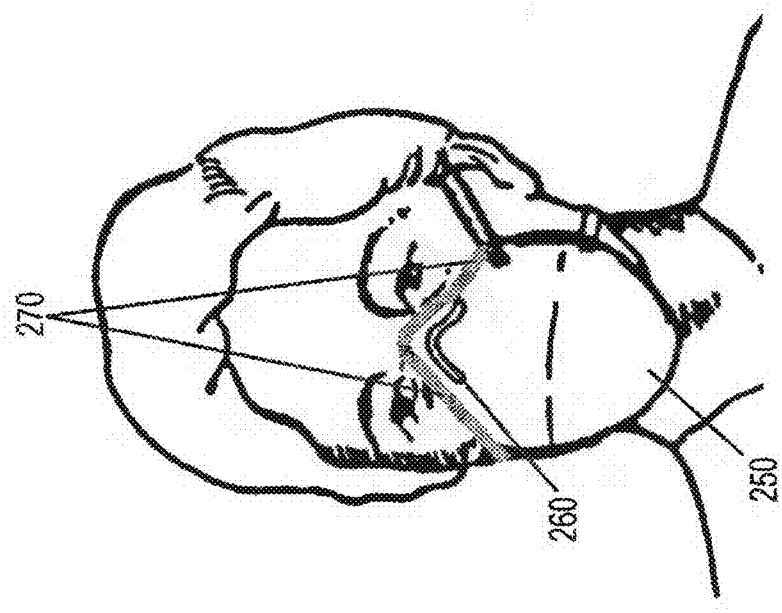
FIGS. 2A and 2B illustrate a respiratory protection device worn by a user in which embodiments of the present invention may be useful.
Figure 2A:
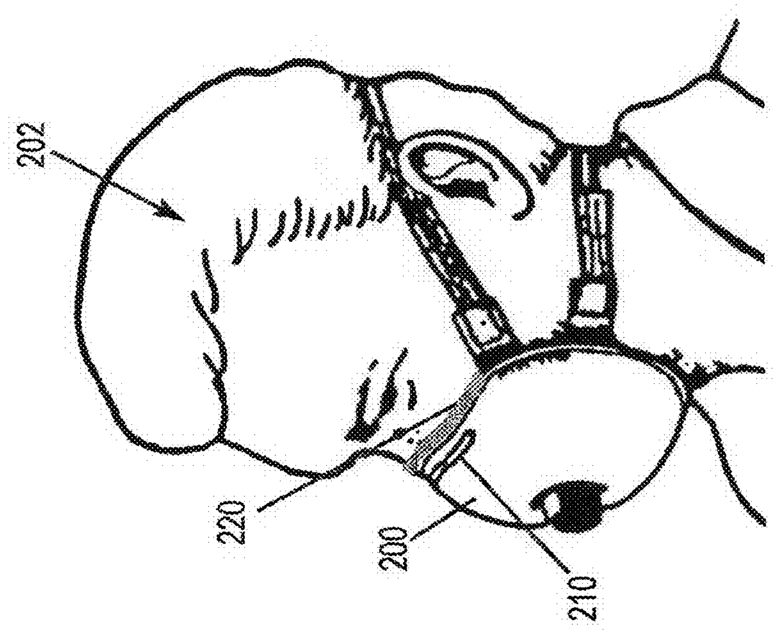

FIGS. 2A and 2B illustrate a respiratory protection device worn by a user in which embodiments of the present invention may be useful. As illustrated in FIGS. 2A and 2B, respiratory protection devices 200 and 250 can be secured over a user's face using a variety of methods other than the lanyard illustrated in FIG. 1.

Respiratory protection devices 200 and 250 are intended to work with a seal along portions 220 and 270. If an imperfect seal is present in portions 220, 270, then exhaled air may be forced upward, causing discomfort for some users, and may also cause respiratory protection devices 200, 250 to move up or down along a nose of user 202. A user can adjust a nose clip 210, 260 to improve the fit of respiratory protection devices 200, 250. However, it is often difficult for a user to get a nose clip 210, 260 into a good fit. For those who wear respiratory protection devices on a daily basis, this can cause irritation as the respiratory protection device rubs up and down on a user's skin. It also decreases the efficacy of the respiratory protection device.

Figure 3A:
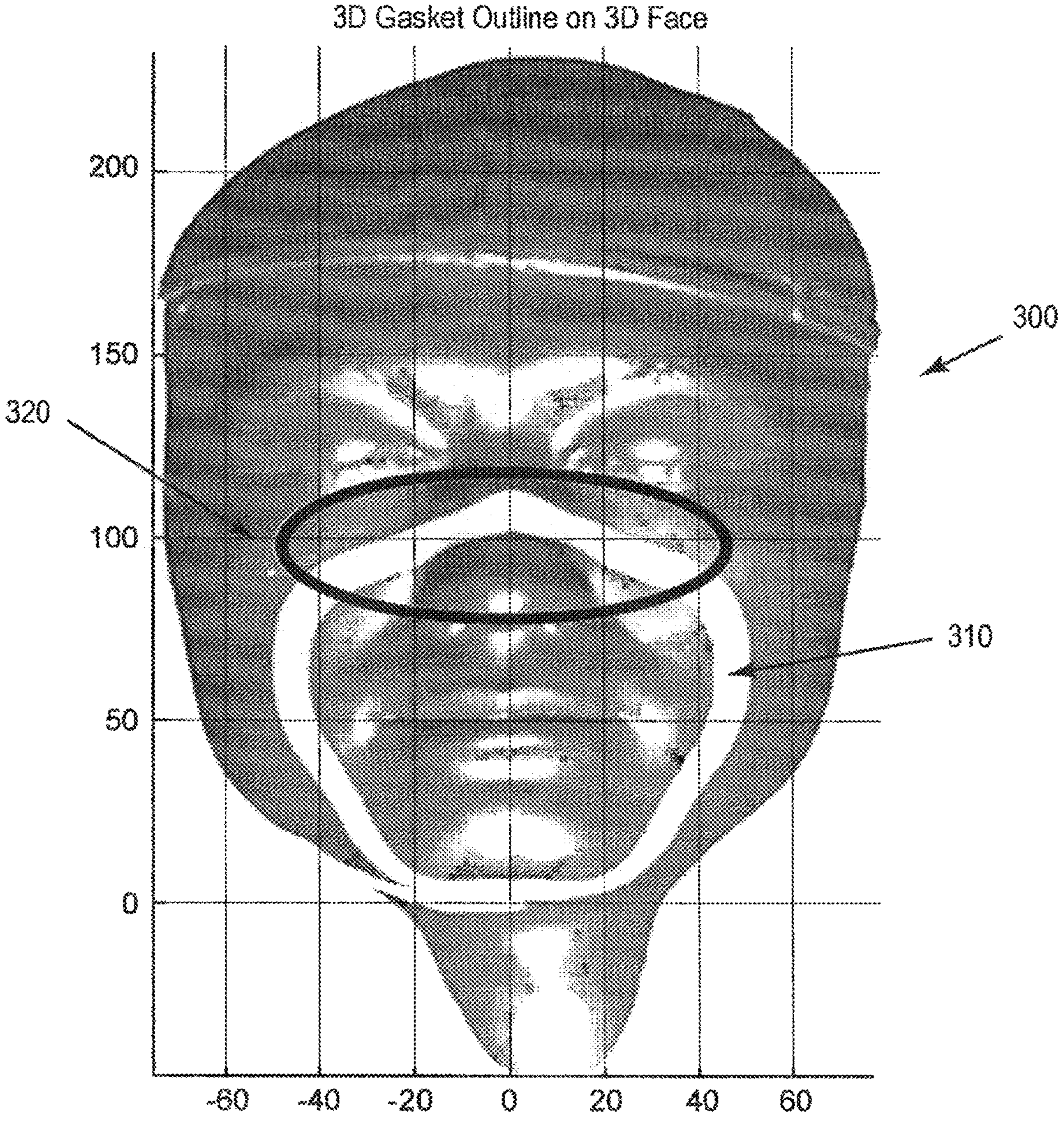
FIGS. 3A-3B illustrate an example user and an example respirator in which embodiments of the present invention may be useful.
Figure 3B:
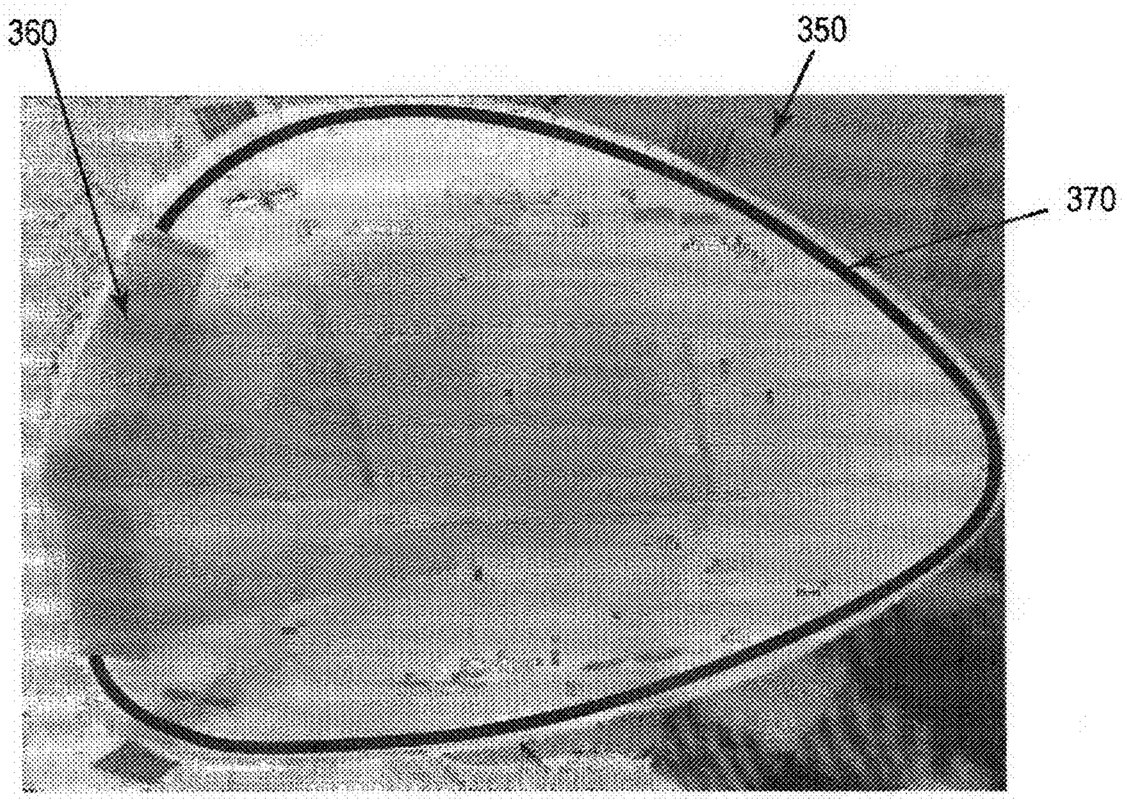

FIGS. 3A-3B illustrate an example user and an example respirator in which embodiments of the present invention may be useful. User 300 has several facial areas that make their face unique. Many of these features can impact how a respiratory protection device fits the user. It is for these reasons that daily wearers of respiratory protection device should undergo fit tests to ensure that they have a particular product suitable for their features, for example position of cheek bones, chin, cheek profile and nose shape.

A respiratory protection device is designed to create a seal around seal perimeter 310. Any gap along seal perimeter 310 can cause air to flow around the respiratory protection device, instead of through a filter layer within the respiratory protection device, which provides a tortuous route intended to capture particulates, including bacteria or viruses. A nose portion of a respiratory protection device will sit somewhere within the area highlighted by portion 320. However, FIG. 3A illustrates one example of one user with a particular nose shape. Specifically, FIG. 3A illustrates the face of a male user of Asian descent. Other users may have more prominent noses, larger noses, smaller noses. Additionally, because a respiratory protection device should fit along the entire perimeter 310, it is also important to consider how other facial features may impact the seal in area 320. For example, while only the bridge of a user's nose interacts directly with a respiratory protection device, the distance to the tip of the user's nose, and the size of the user's nose (e.g. from cheek to nose tip). Additionally, the shape of the user's cheeks and the distance from nose to chin can also affect fit.

FIG. 3B illustrates the interior side of a respirator 350. Some respirators 350 come with a foam component 360 on an interior side. Foam 360 can improve the seal along the nose portion of seal perimeter 370. However, the nose portion 360 still requires deformation of a deformable nose clip to seal portion 360 to a user's face.

As used herein, the term "foam" refers to a resilient polymer foam or other compressible resilient materials. By a polymeric foam, it is meant a polymeric material that exhibits numerous "empty" (e.g. gas or air-filled) cells. In general, any viscoelastic material that deforms when under force is useful material for the nose foam. Useful materials exhibit flat stress-strain curve. Most useful materials exhibit flat stress-strain curve across a large section of strain for example from 20% to 60%, preferably from 15% to 80%, most preferable from 10% to 90%. Example of non-foam viscoelastic material useful in this invention is oil filled Kraton™ such as Kraton™G, available from Kraton™ corp. In many embodiments, such a polymeric foam material may be a closed-cell foam in which the majority of cells are each bounded in all directions by solid cell walls of the polymeric material. (It will be appreciated that even in a closed-cell foam some cells may be connected to other cells, owing to statistical fluctuations in any real-world foam production process.) In various embodiments, the polymeric foam material may exhibit a density (measured with the foam in an uncompressed state, unless otherwise specified) of at most about 0.5, 0.4, 0.3, 0.2, 0.15, 0.1, or 0.05 g/cc. However, in other embodiments, the polymeric foam material is an open-cell foam, such that cell walls have at least one opening between adjacent cells.

By resilient, it is meant that the polymeric foam material can be readily manually compressed (e.g. by the fingers of a human user) to a linear compression factor of at least about 30%; and, that upon the release of any such compression, the material will expand to substantially its original dimensions and overall volume within seconds and preferably instantaneously, as will be readily understood by an ordinary artisan. In various embodiments, a resilient polymeric foam material may exhibit an instantaneous Shore 00 durometer hardness value of less than 60, 50, 40, or 30 when measured according to the techniques disclosed in U.S. Pat. No. 5,188,123, which is incorporated by reference herein for this purpose.

In some embodiments, resilient polymeric foam may be comprised of a slow-recovery polymeric foam material. As defined herein, a slow-recovery polymeric foam material is one that exhibits a recovery time of ten seconds or more when tested for recovery properties according to the procedure disclosed in U.S. Pat. No. 7,475,686, which is incorporated by reference herein for this purpose. In various embodiments, a slow-recovery polymeric foam material may exhibit a recovery time of at least about 15, 20, 25, or 30 seconds. In further embodiments, a slow-recovery polymeric foam material may exhibit a recovery time of at most about 5, 4, 3, or 2 minutes, 90 seconds, or 60 seconds.

In some embodiments, resilient polymeric foam may be comprised of a polymeric foam material that is not a slow-recovery foam material, meaning that the material exhibits a recovery time of less than ten seconds. In various embodiments of this type, the material may exhibit a recovery time of less than about 8, 6, 4, or 2 seconds.

All measurements of foam parameters and properties (e.g. recovery time, density, hardness, and so on) will be understood to be performed at room temperature, e.g. at about 21° C. It will be appreciated that the nose foam may, depending e.g. on the method of manufacture, exhibit a skin layer that is somewhat densified in comparison to an interior portion of the foam body. The skin layer also may be a film.

The polymeric foam material may be of any suitable chemical composition. Such compositions may be chosen from e.g. polyurethanes, latex-modified polyurethanes, polyvinylchlorides, polyvinyl acetates, polyolefins, polysiloxanes, acrylic polymers (e.g. polyacry lates, poly(meth) acrylates, and blends and copolymers thereof), and so on. In some embodiments, such compositions may include poly (lactic acid) polymers. In some embodiments, such compositions may include polyether polyurethanes prepared e.g. from pre-polymers available from Dow Chemical Corporation (Midland MI), under the trade designation HYPOL. In particular embodiments, any such polyurethanes may be modified (e.g. blended) with acrylic latexes of the type available from Dow Chemical Corporation under the trade designation UCAR. Further details and attributes of various polymer compositions that may be suitable for inclusion in the polymeric foam material of foam 360 are disclosed e.g. in U.S. Pat. Nos. 4,158,087, 5,188,123, 5,203,352, 5,650,450, 7,285,576, 7,475,686, and 8,679,607.

The foam may also be a curable foam, for example an impregnated foam with a resin that moisture cures to an elastomer, as described in U.S. Pat. No. 4,888,225 to Sandvig et al., issued on Dec. 19, 1989. Alternatively, the curable foam may be impregnated with a silane terminated resin, such as that described in U.S. Pat. No. 5,423,735 to Callinan et al., issued on Jun. 13, 1995. Curable foams may allow for custom-molded nose foams to be created on-site, allowing a respiratory protection device user to have a respirator, face mask or other respiratory protection device with an improved, custom fit more quickly.

A foam may be made via any suitable process. For example, a foam precursor material may be injected into a mold cavity so as to form a body with substantially the final form of the nose foam: or a foam precursor may be coated onto a carrier film so as to form a large slab of foam. Foaming agents (e.g. carbon dioxide or other gas or low boiling solvents) or the like may be included so that the foam exhibits the desired foam properties (e.g. density, hardness, and so on). Alternatively, the foam may be produced as a "bun" and skived to various thicknesses to form sheets. The shaped nose foam may be obtained from the foam by cutting, punching, or the like, with any excess material being removed if needed (e.g. by trimming, ablating, and so on). In some embodiments a foam sheet may be produced by extrusion/foaming (followed by separating the solidified extrudate into individual foam bodies).

In some embodiment the foam is an open-cell foam. The foam may include a synthetic polymer that is adapted to form a conformable open-cell foam that absorbs sweat and moisture to enhance comfort. Examples of suitable materials for the foams include synthetic organic polymers including, but not limited to: polyurethanes, carboxylated butadiene-styrene rubbers, polyesters, and polyacry lates. The polymeric foams can be made of one or more types of monomers (e.g., copolymers) or mixtures (e.g., blends) of polymers. Examples of foam materials are described in the book entitled "Flexible Polyurethane Foams", Dow Polyurethanes, editors R. Herrington and K. Hock, 1997. Note that foam sheets of different densities may be laminated further enhance fit. It is also recognized that so called "felted" foam which have been processed under heat and pressure to increase the density also may be used.

Foam 360 can be of a wide range of thicknesses: from about 1 mm to about 30 mm thick. Furthermore, foam 360 can include one or more layers tailored to have the desired properties. These layers can be directly bonded to each other or bonded together with adhesive layers. Optionally, disposed between these layers can be one or more layers of polymeric netting or nonwoven, woven, or knit webs for enhancing the physical integrity of the foam. In one embodiment, the second surface of the foam comprises a foam with a skin to prevent particle transmission. One example of a suitable absorbent open cell polyurethane foam is found in a 3M Tegaderm™ High Performance Foam Dressing available from 3M Company of St. Paul, MN, USA.

The average cell size of the total foam structure is typically at least 100 microns. In some embodiments, the average cell size is at least 150, 200, 250, or 300 microns. As used herein, average cell size refers to the average cell size as determined using a microscope.

The foam is typically a non-collapsed foam. A non-collapsed foam typically does not substantially expand upon contact with aqueous fluids, such as sweat or water.

In some embodiments, the foam is a polyurethane foam. Polyurethane polymers are generally formed by the reaction of at least one polyisocyanate component and at least one polyol component. The polyisocyanate component may comprise one or more polyisocyanates. The polyol component may comprise one or more polyhydric alcohols or so called "polyols". The concentration of a polyol may be expressed with regard to the total polyol component. The concentration of polyol or polyisocyanate may alternatively be expressed with regard to the total polyurethane concentration. Also, potentially useful are polyureas and polyurethane/polyueas. Polyureas are made by reacting a polyisocyanate with a polyamine and/or with water.

Polyurethane foam can be made by various methods as described in the art. In the preparation of polyurethanes, two or more liquid streams are usually combined. The mixing of such liquid streams initiates polymerization and the foaming of the polymerizing material. The foams can be prepared by any known processing methods. In some cases, polymerization and shaping are affected in one step, for example, casting the foam into a continuous thin layer appropriate for an absorbent article. In some cases, polyurethanes are prepared in the form of slabstock, which is subsequently cut to the desired shape. The slabstock can be prepared in either a batch process or a continuous process. In some cases, the polyurethane can be polymerized in a cylindrical shape which is then peeled to make a long, thin layer of foam. In some cases, the polyurethane can be polymerized in a long, generally rectangular shape that is subsequently cut into thinner foam layers appropriate for use in an absorbent article. In some cases, several thin layers of foam can be spliced to form a single, longer layer that may facilitate manufacturing of absorbent articles. In most cases, the liquid streams are a polyisocyanate component (often referred to as "component A") and a polyol component (often referred to "component B"). Mixing of component A and component B can be accomplished in either high or low pressure delivery systems. Usually component B will contain water which reacts with the polyisocyanate of component A to form an amine and to release $CO_2$, which in turn functions as a blowing gas. In some cases, auxiliary blowing agents, such as inert gases $CO_2$ or $N_2$, or high vapor pressure solvents, or chemical blowing agents such as azo and diazo compounds, may be incorporated. Such methods are well described in the literature (See for example "Polymeric Foams and Foam Technology: Daniel Klempner & Vahid Sendijarevic").

In one embodiment, the polyurethane foams are generally prepared by continuous casting of a thin layer of foam onto a substrate, such as described in U.S. Pat. No. 2,957,207. Although U.S. Pat. No. 2,957,207 emphasizes the importance of introducing a limited delay after the polyol component and polyisocyanate component have been mixed, such delay is not typically utilized when the foam is conveyed between a pair of metering rolls such that the gap setting of the metering rolls controls the thickness of the foam. The foam is typically cured at an over temperature ranging from about 100° F. to 275° F. Alternatively, the foam can be made as blocks that are cut to the desired thickness or by casting the foam in an open or closed metallic mold.

Other suitable foam materials may also be used such as silicone foam, Kraton™ foam, olefin foam, or another suitable foam.

Commercially available silicone foams result from the condensation reaction between SiH and SiOH in the presence of a catalyst (typically platinum). Hydrogen gas is formed when the three components are mixed together and many of these bubbles together make the material a foam (blowing) while it's being cured. Typical blowing agents suitable for making silicone foams are expanding microspheres available from Expancel®, Inc. Silicone foams have very good high temperature stability, and hence are well suited to make using thermoexpandable microspheres.

Kraton™ foams also have desirable properties such as softness due to high capacity for mineral oils, chemical inertness, and color stability. Kraton™ foams are elastomeric tri-block polymers comprising high Tg end blocks made of polystyrene and low Tg center block made of one or more isoprene, butadiene, and the like. Such polymers can be plasticized by adding center block miscible oils knowns as rubber phase plasticizing hydrocarbon oils, such as Polybutene-8 from Chevron, KAYDOL from Witco, and SHELLFLEX from Kraton™ Polymers. In some embodiments, Kraton™ foam comprises at least 90% styrene-ethylene-butene-styrene (SEBS) triblock polymer and between 10% and 0.5% of an appropriate unactivated foaming agent, such as physical or chemical foaming agent. Preferred physical foaming agents include EXPANCEL® 930 DU 120, EXPANCEL® 920 DU 120, both available from Eka Chemicals AB of Sundsvall, Sweden. Chemical foaming agents azo and diazo compounds and oxybis benzene sulfonyl hydrazide (OBSH) are available from Biddle Sawyer Corp. of New York, N.Y. In an exemplary embodiment, foaming agent includes an unactivated expandable sphere foaming agent and an unactivated chemical foaming agent. The presence of both an expandable sphere foaming agent and a chemical foaming agent may assist in providing well controlled foam structure.

Commercially available olefin foams include cross-linked polyethylene foam sold under the trade name Volara Type A sold by Volek, LLC (Laurence, MA) Olefin foam as described in 3M patent U.S. Pat. No. 7,094,463.

In some embodiments, foams may further include pigment to impart a desired color, antioxidants, UV stabilizers, and oils or waxes to aid in extrusion and mold release as known in the art.

Some foams may be formed using Expancel R-brand microspheres, which consist of a very thin thermoplastic shell (a copolymer, such as methyl methacry late) that encapsulates a hydrocarbon blowing agent (typically isobutene or isopentane). When heated, the polymeric shell gradually softens, and the hydrocarbon begins to gasify and expand. When the heat is removed, the shell stiffens and the microsphere remains in its expanded form. Expansion temperatures range from 80° C. to 190° C. depending on the grade. The particle size for expanded microspheres ranges from 20 μm to 150 μm, depending on the grade. When fully expanded, the volume of the microspheres increases more than 40 times.

Additionally, suitable foams may be made from a variety of thermoplastics such as linear low density polyethylenes (e.g., those available under the trade designation DOWLEX™ from Dow Chemical Company, Midland, Michigan), thermoplastic polyolefinic elastomers (TPE's, e.g., those available under the trade designations ENGAGE™ from Dow Chemical Company, Midland, Michigan: and VISTAMAXX™ from Exxon-Mobil Chemical Company, Houston, Texas), ethylene alpha-olefin copolymers (e.g., the ethylene butene, ethylene hexene or ethylene octene copolymers available under the trade designations EXACT™ from Exxon-Mobil Chemical Company, Houston, Texas: and ENGAGE™ from Dow Chemical Company, Midland, Michigan), ethylene vinyl acetate polymers (e.g., those available under the trade designations ELVAX™ from E. I. DuPont de Nemours & Co., Wilmington, Delaware), poly butylene elastomers (e.g., those available under the trade designations CRASTIN™ from E. I. DuPont de Nemours & Co., Wilmington, Delaware: and POLYBUTENE-1™ from Basell Polyolefins, Wilmington, Delaware), elastomeric styrenic block copolymers (e.g., those available under the trade designations KRATON™ from Kraton Polymers, Houston, Texas: and SOLPRENE™ from Dynasol Elastomers, Houston, Texas) and polyether block copolyamide elastomeric materials (e.g., those available under the trade designation PEBAX™ from Arkema, Colombes, France).

It is known that individuals may wear a respiratory protection device in a variety of position. For example, a position of a nose portion on a user's nose may move up or down based on the presence of glasses. Additionally, the same person may wear one model of respiratory protection device in a different position than a second model, or may move a position based on the presence of additional PPE, such as glasses or goggles. Additionally, a respiratory protection device may move position as a user walks, runs, talks, yawns or performs basic functions.

There exists a strong need for a way to customize a respiratory protection device for a user so that the respiratory protection device has an improved seal against the user's face, both for safety considerations and comfort. In the past, a nose clip has been added, often formed of metal, that can be manipulated by a user. However, while a user can manipulate a nose clip, it may be done after a fit test for the individual has been conducted (e.g. when an individual discards a first respiratory protection device and applies a second respiratory protection device). The user may have passed a fit test with the first respiratory protection device, but may fail the same fit test when the respiratory protection device is in a new position. It is desired to have a solution that assists an individual in maintaining safe use of respiratory protection devices in day to day operation.

Systems and methods herein provide consistent form-fitting nose portions for respiratory protection device. Described herein are systems for providing a better fitting respiratory protection device including assisting a user in selecting a nose foam that best fits their facial structure. In some embodiments, a custom nose foam, or custom template is provided.

A plurality of semi-custom nose foam templates are disclosed. Systems and methods are disclosed for scanning a user's facial features and, based on the scan results, selecting a nose foam template that best fits their face and will best form a seal when used on a selected respiratory protection device product.

A system for forming a plurality of semi-custom templates is described in WO 2019/155315 A1, published on Aug. 15, 2019. The '315 publication describes a method of forming a plurality of semi-custom orthodontic bases that includes acquiring 3D digital data of anatomical physiology of a number of users. Based on the anatomical data collected, a plurality of classes of similar shapes and sizes are generated. Each of the plurality of classes is then represented by a best-fit of the samples of each class. Similarly, a plurality of nose foam shapes are generated based on physiology data obtained. In fact, systems herein may obtain data that can be used to deidentify facial anatomy and provide an improved set of nose foam templates.

Based on an obtained set of 3D facial scans of a large number of individuals, algorithms were applied to manipulate the areas of interest, e.g. the portion of the face where a respiratory protection device will contact and seal, e.g. the seal area within seal perimeter 310. Each facial scan was deidentified and the relevant portions were retained. The relevant portions were then averaged, segmented and clustered. Based on that clustering, a number of average facial feature templates were obtained.

Because a fully custom nose foam would require time to take facial scan measurements, send a custom nose foam template to a foam cutting machine, and then time to transport the custom nose foam to a requesting customer, many embodiments herein envision having a plurality of templates available for immediate selection for a user, with systems and methods herein drawn to matching one of the templates to a user.

However, it is expressly contemplated that fully custom nose foam templates are envisioned for many embodiments herein. For example, industrial settings may find it cost-effective to include systems that output a DXF, vector format, or other suitable file for an on-site CNC or other cutting machine to cut a custom fitting nose foam template, such that all employees have custom-fit respirators and masks with a quality seal. Similarly, retail outlets may find it attractive to keep a user in the store for the time that it takes for a custom-foam to be cut, or cured. It also is appreciated that compressing the foam at certain points or regions while cutting can produce various three dimensional shapes.

Additionally, as such systems become available, it may be possible to obtain a larger variety of facial scans, to better tune templates available in different regional markets. For example, an Asian male is illustrated in the facial scan image of FIG. 3A, and it is expected that respiratory protection device users of Asian descent will generally have different facial features than respiratory protection device users of European descent. Therefore, a different plurality of templates may be offered to customers in Asia than those in Europe, in an attempt to provide more accurate templates for prospective users.

During the COVID-19 pandemic, the use of FFRs by healthcare workers, first responders, and the populace generally, millions of FFRs were used and discarded daily, worldwide. Further, many entities have stockpiles of supplies, including FFRs, that need to be replaced when expired. Expired FFRs, and used FFRs, are disposed in landfills currently because they are not recycled. This has raised environmental concerns and has led to calls for recyclable FFRs. A respirator made of only-olefin may be easily recycled. The respirator should also be metal free for ease of recycling processing. It may also allow incorporation of recycled olefin material.

Eliminating the cup, metal nose clip and nose foam allows the respirator on this invention to be recyclable. Moreover, eliminating those components compensates for the cost increase from manufacturing and adding the semi-custom, thermoformed foam seal.

FFR components as described herein may be used as molding substrate for thermoforming rigid or semi-rigid olefin foam that can be welded to 3D, self-supporting filter media forming a recyclable FFR. The semi-customizable shape of the foam provides good seal with the user face eliminating the need for nose foam and metal nose clip, allowing for recycling of the respirator when used or expired.

Other foams suitable for this invention include those described in U.S. Pat. No. 7,094,463. Particularly useful propylene copolymers are those of propylene and one or more non-propylenic monomers. Propylene copolymers include random, block, and grafted copolymers of propylene and olefin monomers selected from the group consisting of ethylene, C3-C8 α-olefins and C4-C10 dienes. Propylene copolymers may also include terpolymers of propylene and α-olefins selected from the group consisting of C3-C8 α-olefins, wherein the α-olefin content of such terpolymers is preferably less than 45 wt %. The C3-C8 α-olefins include 1-butene, isobutylene, 1-pentene, 3-methyl-1-butene, 1-hexene, 3,4-dimethyl-1-butene, 1-heptene, 3-methyl-1-hexene, and the like. Examples of C4-C10 dienes include 1,3-butadiene, 1,4-pentadiene, isoprene, 1,5-hexadiene, 2,3-dimethyl hexadiene and the like. Most suitable olefin foams are cross-linked polyethylene foam sold under the trade name Volara Type A sold by Volek, LLC (Laurence, MA)

FIGS. 4A-4G illustrate nose foam templates in accordance with embodiments herein.

Figure 4A:
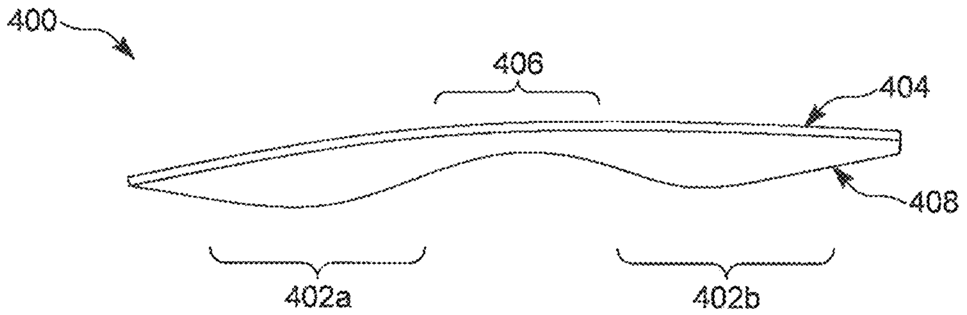
FIGS. 4A-4G illustrate nose foam templates in accordance with embodiments herein.

FIG. 4A illustrates a nose foam template 400. Nose foam template 400 is made of a compressible or compliant material that forms a body between a respiratory protection device-edge portion 404, that matches to an upper edge of a respiratory protection device, and a face-engaging edge 408. Nose foam template 400 is intended to be used with a respiratory protection device 350, for example in exchange of foam 360, to provide an improved fit. Nose foam template 400 may be provided to a user as part of a kit, for example, with a bonding material such as glue, tape, mechanical fasteners, pressure sensitive adhesives, etc. The bonding material may be adhered to one face of the respiratory protection device, to be attached to the seal portion of a respiratory protection device, in some embodiments. This may be useful for users that will re-use the same respiratory protection device, so that the template 400 maintains a relative position to a respiratory protection device. In other embodiments, the bonding material is adhered and applied to a user's face, over which the respiratory protection device is applied. This may be useful for users who exchange respiratory protection devices frequently throughout the day, as one template 400 may be used for multiple respiratory protection devices. Alternatively, the foam template 400 may be adhered with a hook and loop system such as 3M Scotchmate™ Reclosable fastener.

Contour 408 is selected based on a best match to a user's face based on available template options. Nose foam template 400 includes first and second cheek portions 402*a*, 402*b* separated by a nose bridge portion 406. In most embodiments, cheek portions 402*a* and 402*b* are mirror images about a line of symmetry perpendicular to the nose foam, extending through bridge portion 406. However, it is contemplated that, in embodiments where a fully custom template is provided, that one cheek portion 402*a* may be wider than portion 402*b*, for example to accommodate facial scarring or irregularities.

As illustrated in FIGS. 4B-4G, the body of a nose foam template may vary in shape, size and dimensions based on anticipated facial features. For users with thinner or smaller noses, a nose bridge portion may be smaller. For users with thicker or larger noses, nose bridge portion may be larger, or cheek portions may be thicker. The depth of the nose bridge is proportional to the size bone. As used herein, length refers to the dimension that extends across a user's face, e.g. from cheek to cheek. As used herein, width refers to the vertical dimension of a user's face. As used herein, thickness refers to the thickness of the foam forming the nose foam portion.

Figure 4B:
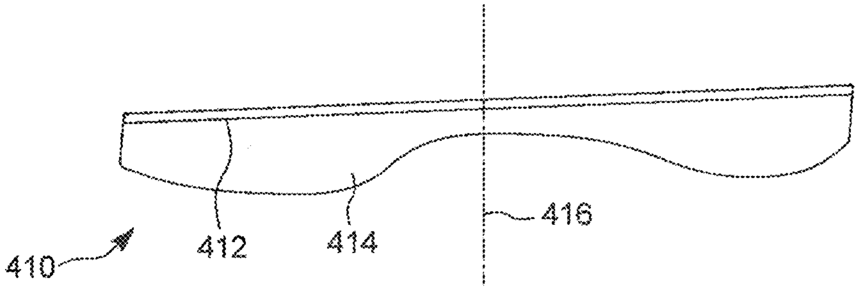

FIG. 4A illustrates a nose foam where both contours 408 and 404 have curvature. However, as illustrated in FIG. 4B, respirator edge portion 412 of nose foam body 414 may have substantially no curvature. A nose foam template 410 may be asymmetric about a center axis 416, as compared to FIG. 4A, which illustrates a symmetrical nose foam body 400.

Figure 4C:
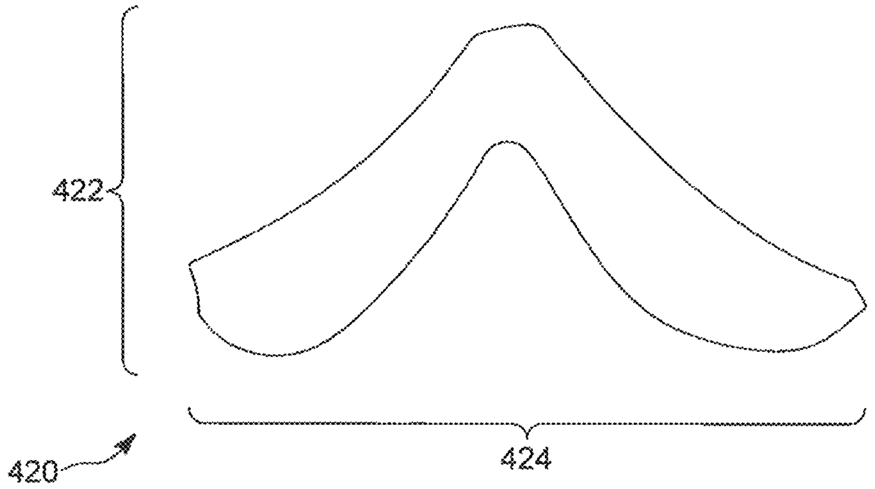

FIG. 4C illustrates a nose foam template 420 where a length 422 and a width 424 of the nose foam body are closer in size, e.g. within a ratio of $0.5<L/W<2.0$.

Figure 4D:
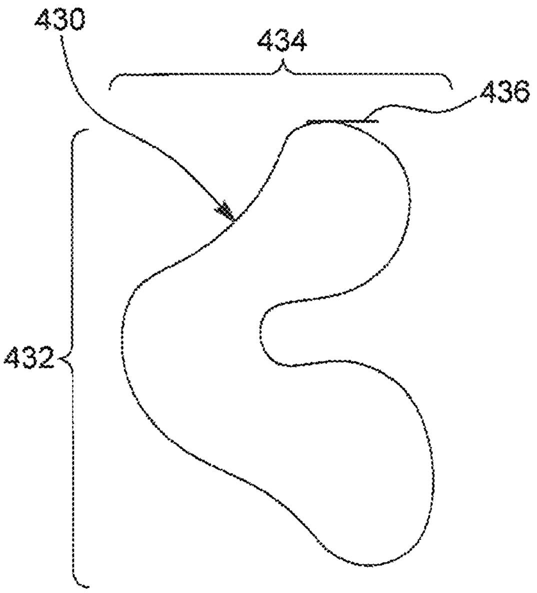
Figure 4E:
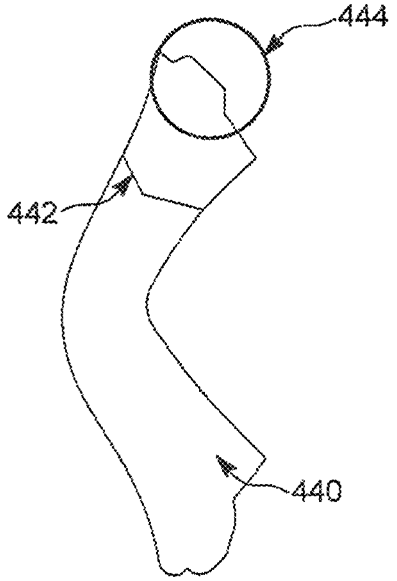

While FIGS. 4A-4C illustrate nose foams with a width that changes along a length, all had a constant thickness. In contrast, FIGS. 4D and 4E illustrate nose foams 430, 440 with a variable thickness. FIG. 4D illustrates a thickness 436, in addition to width 434 and length 432. Both 4D and 4E have a tapered thickness, illustrated in FIG. 4E by taper 442. However, while FIG. 4E illustrates a nose foam 440 that lays flat on one side, FIG. 4D illustrates a nose foam 430 that does not lay flat, but has a 3D structure.

FIG. 4E also illustrates edges with tabs 444, which may provide some additional comfort to a user's cheekbones.

Figure 4F:
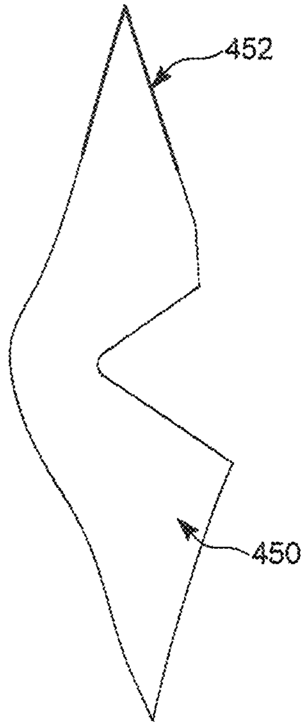

In contrast to FIGS. 4A-4D, and 4G, which have a straight edge at the ends of a length of a foam body, FIG. 4F illustrates a nose foam 450 that ends at a vertex 452. Such tapering within the plane of nose body 450 may also provide increased comfort to some users.

Figure 4G:
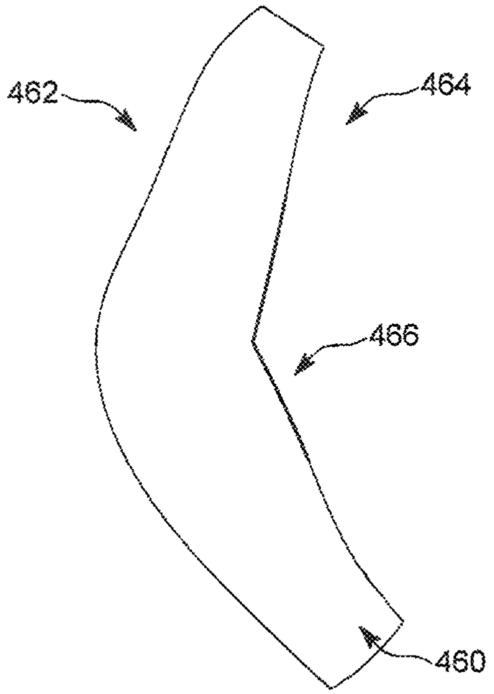

FIG. 4G illustrates a nose foam 460 with a substantial curve on both a top edge 462 and a bottom edge 464, with bottom edge 464 having a vertex 466 substantially at the center axis of nose foam 460.

FIGS. 4A-4G illustrate a plurality of nose foam shapes that may be used, as described in embodiments herein, to provide an improved fit for a user wearing a respiratory protection device. As described herein, the nose foam bodies are separate from a respiratory protection device, but may be attachable either mechanically (e.g. a fastener, mechanical fastener tape, clips, etc.) or through an adhesive that more permanently couples the nose foam to the respiratory protection device, or through an adhesive that couples the nose foam to the face of a user. The nose foam may be discontinuous, in some embodiments, such that it does not extend an entire length of the length of the respiratory protection device.

The shapes of nose foam bodies 400, 410, 420, 430, 440, 450 and 460 are illustrative, and it is expressly contemplated that other shapes are possible and envisioned, or even preferred, depending on the facial features of a respiratory protection device wearer. For example, nose foam body 400 illustrates a contour 408 that may be described as sinusoidal. However, either of the amplitude and period of a sine wave forming contour 408 may be increased or decreased as needed to improve a fit. Similarly, a ratio of a length to width of a planar nose foam, a thickness of the nose foam, a taper of the nose foam, or other physical attribute may be adjusted to improve fit for a particular user's unique facial features.

Figure 5:
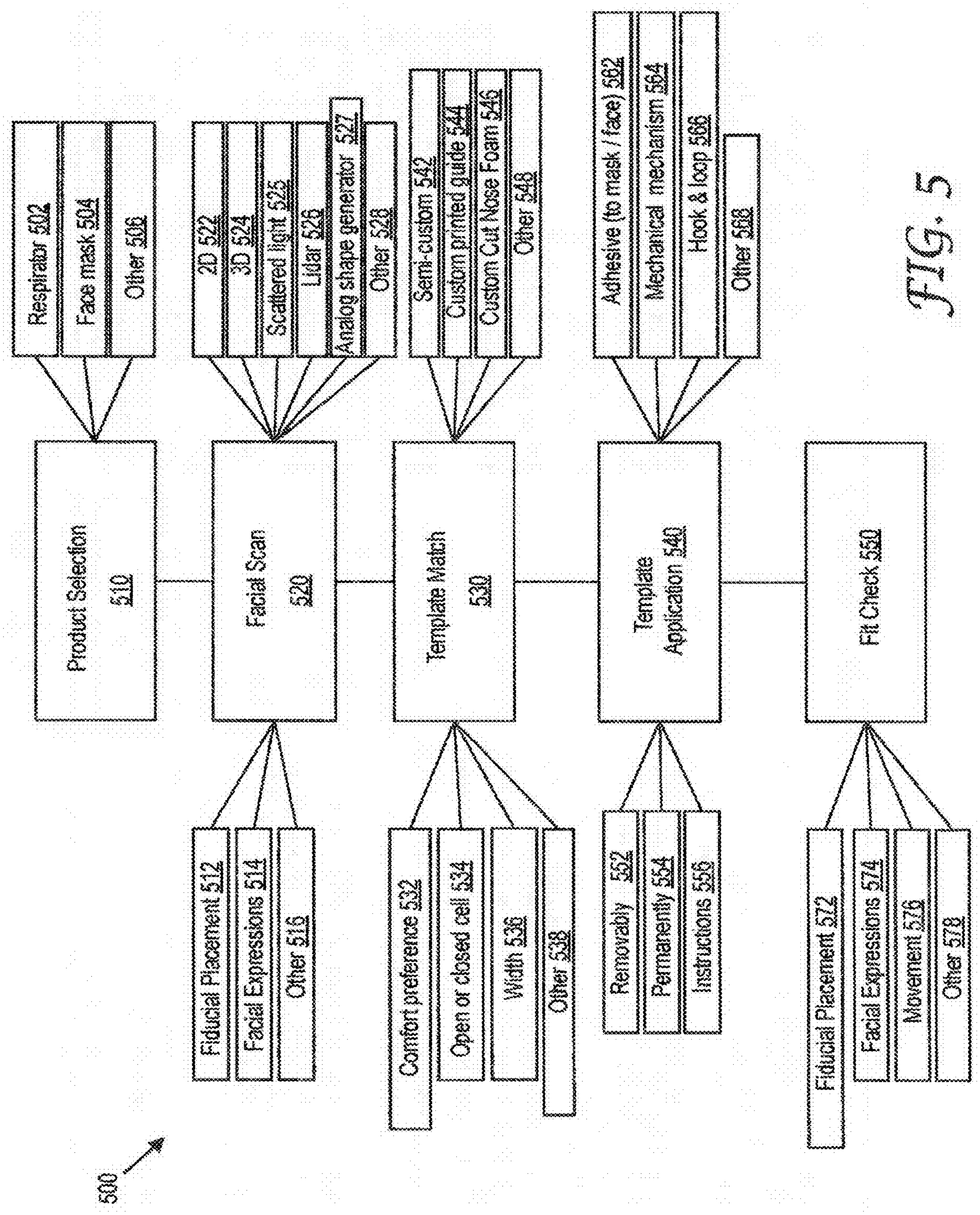
FIG. 5 illustrates a method of form-fitting a respiratory protection device to a user's face in accordance with embodiments herein.

FIG. 5 illustrates a method of form-fitting a respiratory protection device to a user's face in accordance with embodiments herein. Method 500 may be used by any individual looking to have a better fitting, more comfortable and better sealed respiratory protection device.

In block 510, a product selection is made. The product selection may be made based on a user preference, e.g. a user walking into a retail store and selecting a particular respiratory protection device. The product selection may be based on whether or not a user has passed an OSHA-fit test for a given product. The product selection may also be based on a facial scan, e.g. in some embodiments step 520 is performed before step 510 and, based on the facial scan, a product may be recommended that best fits a user's face and/or a desired safety specifications of the user. The product selected may be a respirator 502, such as an N95, KN95, N99, N100, R95, P95, P99, P100, or another suitable respirator. The product selected may also be a non-respirator face mask 504, such as a cloth face mask, a dust mask, or another face covering product 506.

In block 520, a scan of a user's face is conducted. The scan may be conducted of the user without a respiratory protection device, with a respiratory protection device, or both. The scan may be done using a fiducial 512 to get an accurate measurement of facial features. The fiducial may be a pre-measured item that the user puts on their face, such as a 1"×1" square. Alternatively, the fiducial may be in the background—e.g. the user may stand in front of a ruler or other size indication. The fiducial may be configured to give depth information as well. Additionally, the user may be instructed to make one or more multiple facial expressions, as indicated in block 514. For example, the user may be asked to smile, frown, yawn or speak. Other requirements or requests may be indicated during the scanning phase, as indicated in block 516. For example, head on and side views may be captured, in some embodiments.

The scan may take 2D images, as indicated by block 522, for example by a camera or video camera. The scan may also capture 3D renderings, as indicated in block 524, for example using a 3D camera or scanner. 3D structures may also be generated using a "structure from motion" method. Scattered light may also be used to capture facial features, as indicated in block 525. LIDAR may also be used, as indicated in block 526.

An analog shape generator may also be used, as indicated in block 527, such as a pin art board. However, for cleanliness purposes, analog shape capture may be a less preferred embodiment. Other methods may also be used, as indicated in block 528. An array of pins (see https://en.wikipedia.org/wiki/Pin_Art) also may be used to very accurately obtain facial contour information. In this case the customer may press their face into a pin array that is aseptically protected with a disposable film or nonwoven covering. The array may be 3 dimensional or only 2 dimensional such as a Varsk Contour Gauge Duplicator.

Other analog shape generation systems may also be used, such as a molding process may be undertaken. In some embodiments, a user may form a mold or a cast of their face, for example using putty, a curable polymer or another material which may be provided to a user. In some embodiments, a molding kit may be provided, and the user may then send a mold or respiratory protection device to a manufacturer.

In block 530, a template match is provided. The facial scans may detect facial contours and, based on those contours, a nose foam template is provided. The template match may be made, in part, based on a comfort preference 532 of a user, for example a tight or loose fit. Material selection of a nose foam may include open or closed cell foam structures. Additionally, a width 536 of the nose foam, e.g. an area of a face of a user covered by the nose foam, may be adjustable. For example, facial recognition technology and software such as LIDAR may be used and then compare the facial image to a known library of facial structures which have been tested and proven to yield a good seal for a particular respirator seal selection. Importantly, both profile and frontal images may be taken to get a superior representation of the customer's face.

The template match may be a semi-custom match 542. For example, a template matching system may compare detected facial contours to each of a number of available templates and, based on that comparison, indicate which template is the best match. The template match may also be a custom printed guide 544, e.g. an additively or subtractively manufactured guide that the user can then use to cut a nose foam out of a layer of foam at their leisure. This may be beneficial for users who intend to apply nose foam templates to a plurality of respiratory protection devices. The custom-printed template may be shaped with a contour that matches the scan results of the user's face. Similarly, as illustrated in block 546, the template match may be a custom-cut nose foam. For example, while the user waits, their nose foam template may be laser cut, die cut, foam molded or otherwise manufactured on the spot. In another example, the specifications for the nose foam template may be sent for manufacturing, and the fully custom nose template may be ready for pickup at a later time. In a retail setting, the fully custom nose template may be ready in a matter of minutes to hours. Alternatively, the fully custom nose template may be mailed to the user at a later time. These, and other embodiments 548, are expressly contemplated.

It is also contemplated that the foam contour may be made using a low melting thermoplastic bonded to the foam to form a laminate. The contour may be made by heating the laminate above the melting/softening point and apply this to the face of the customer and allowing it to cool. Alternatively, the laminate is heated above the softening point and the shaping is done by a suitable instrument. Suitable low melting/softening thermoplastics are disclosed in U.S. Pat. No. 5,593,628.

In some embodiments, a user might have several different foams generated. For example, the face-touching side of each nose foam is custom-generated for their face, but the respirator matching side may vary to better match each of a plurality of respirator interiors. For example, a 3M™ 1860 respiratory may have a different respirator-touching contour than a 3M™ Aura™ Respirator.

In some embodiments, the user may receive a strip of uncut foam and a printed template (e.g. printed on paper, 3D printed, laser-cut, etc.). The user may also receive instructions to place the template over the foam, cut around the template, reuse the template as needed. In another embodiment, the user may receive a strip of foam with several custom foam outlines printed directly onto the foam, and instructions to cut out each template as needed.

In block 540, the nose foam template is applied. The nose foam template is worn such that it contacts a user's face, on one surface, and a respiratory protection device interior, on another surface. The template may be removably applied, as indicated in block 552, for example using a hook and loop system 566, e.g. with the hook portions of the hook and loop applied to the respiratory protection device-engaging surface such that they engage the fabric of a respiratory protection device. Removably may also refer to the use of a mechanical mechanism 564. For example, clips, snaps, buttons or just the compression force of the respiratory protection device against the nose foam template. Similarly, in some embodiments, friction against the respiratory protection device and the user's skin may be sufficient to maintain placement of the nose template. The nose foam template may also be permanently applied, as indicated in block 554. Permanent application may include the use of an adhesive 562. For example, an adhesive strip may be provided in a kit with the nose foam template, in one embodiment. The adhesive strip may have one side of adhesive for attachment to the nose foam, for example selected based on the nose foam material. The adhesive strip may have another side of adhesive for attachment to the respiratory protection device, or to the user's face. For example, the user may prefer to wear one nose foam all day, in place, while respiratory protection devices are taken on and off. This may ensure proper placement of the nose foam, and may help ensure proper sealing each time the respirator protection device is applied. These, and other suitable attachment mechanisms 568 are also envisioned.

The nose foam template may be provided with instructions 556, which may be printed or provided through a user interface. The instructions may be interactive. For example, in embodiments where a camera image is taken of the user's face, an overlay of the user's image may indicate exactly where the nose template should be applied.

In block 550, a fit check may be conducted to ensure that the combination of respiratory protection device and nose template form a proper seal. In some embodiments, fit testing is done in accordance with OSHA standards according to an approved fit testing protocol. However, it is expressly contemplated that a fit test may be as informal as a user trying on a respiratory protection device and deciding it fits, to as formal as an annual OSHA-mandated fit test conducted by an industrial hygienist. Additionally, method 500 may be incorporated into a fit testing process, for example such that while a user is getting their fit test pass card filled out, the nose foam (or template) is being manufactured such that it is ready for use when the wearer is. In such embodiments, the face scans are obtained as part of the fit test process, e.g. the user without the respiratory protection device is scanned, then the fit test conducted, and then the scan taken with the respiratory protection device on. Fit testing may be done by using a fiducial placement 572, and asking a user to undertake multiple facial expressions 574, make different movements 576, or undertake other tasks 578. The placement of the fiducial can then be compared to determine whether the respiratory protection device remained in place.

It is expressly contemplated that user facial scan information may be stored and deidentified. For example, only portions of the scan related to the upper face, e.g. the shape of a user's nose and mouth are pertinent to nose foam manufacture. Therefore, other portions of the facial scan, such as eyes, ears or neck may be removed, or not stored in the first place. The deidentified information may be analyzed for providing improved respiratory protection device manufacture. For example, some respiratory protection device models may be determined to better fit some facial profiles over others. It may also be seen which way users default to wearing a given product, which may help to improve guidance to future users of said product.

In some embodiments, a nose foam template may be useful for multiple respiratory protection devices. However, in some embodiments, a nose foam template is only good for a single product SKU. For example, in some embodiments, it may be possible for a nose template system to obtain information about a respiratory protection device by reading a barcode or otherwise recognizing the product. Product specifications, such as the presence and dimensions of a nose clip within the respiratory protection device, sizing information and options may also be retrievable, for example, from a device memory.

Figure 6:
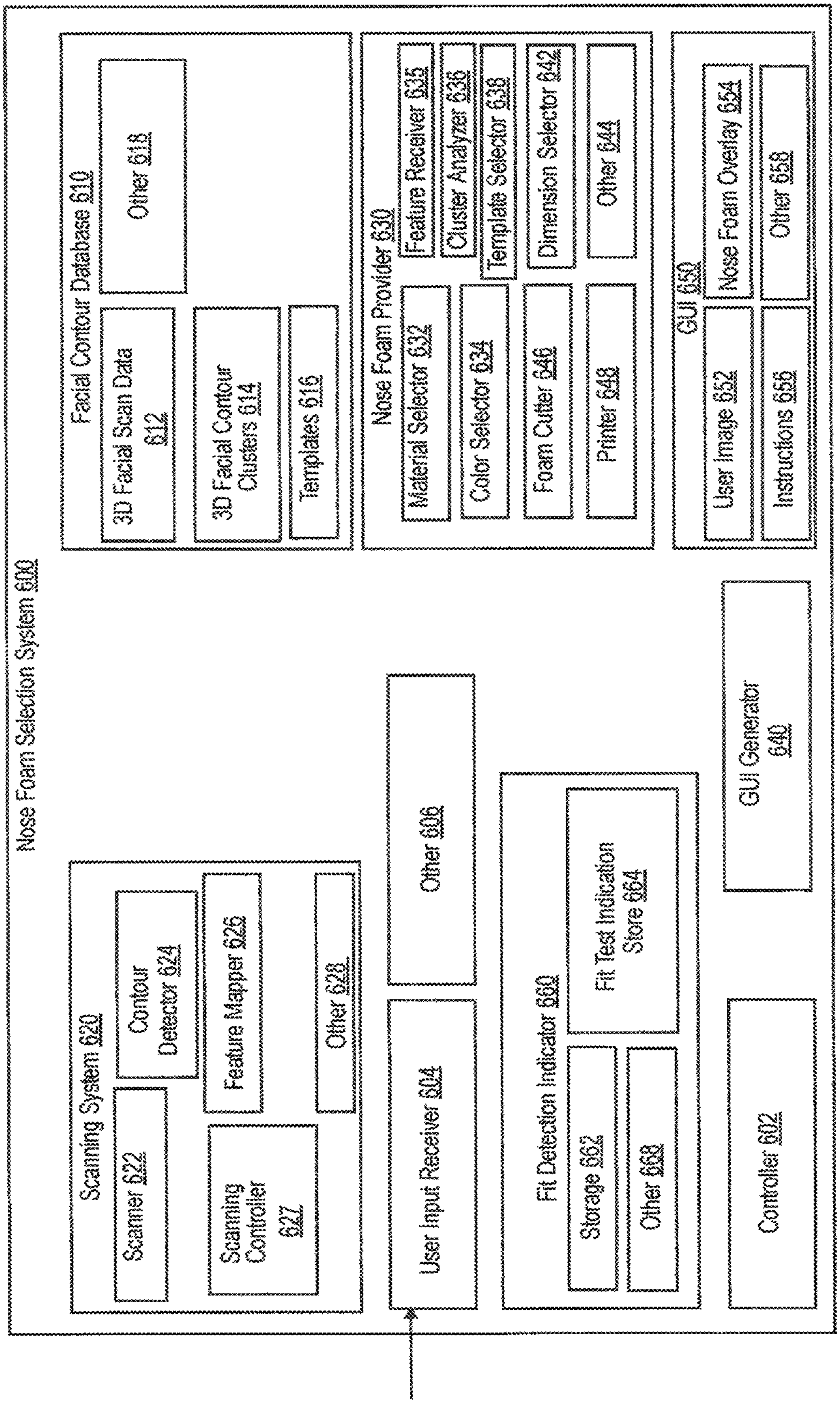
FIG. 6 illustrates a system for form fitting a respiratory protection device to a wearer in accordance with embodiments herein.

FIG. 6 illustrates a system for generating a nose foam template for a wearer in accordance with embodiments herein. System 600 may be useful for forming or recommending a nose foam template that best fits a facial contour of a wearer.

Nose foam selection system 600 is communicably coupled to a facial contour database 610, which houses 3D facial scan data 612 taken from a number of users. In some embodiments, data captured by a scanning system 620, described below, is deidentified and provided to facial contour database 610 to provide a broader array of scan data 612. Based on scan data 612, a number of 3D facial contour clusters 614 are identified. For example, facial contour clusters 614 may include different nose shapes, cheek profiles, nose sizes, etc. Based on the facial contour clusters 614, in some embodiments, a number of nose foam templates are generated to provide a plurality of best fit options for a user. Facial contour database 610 may also include a plurality of nose foam templates 616, each of which may correspond to one or more of the facial contour clusters 614, in some embodiments.

System 600 includes a user input receiver 604, which may receive preference information from a user, for example preferences about a preferred respiratory protection device, a preferred comfort level (loose or tight fit), headbands or ear loops, color selections, etc.

System 600 includes a scanning system 620. Scanning system 620 may be contained within a computing device, such as a mobile phone application, in some embodiments. In other embodiments, scanning system 620 may be incorporated into a booth or station either in an industrial setting or a retail establishment. Scanning system 620 includes a scanner 622 such as a 2D camera or video camera, or a 3D camera, or a system of camera. Scanner 622 may also be, in other embodiments, a scattered light sensor, a laser-based sensing system such as LIDAR, an analog system or another suitable system. Based on the signals from scanner 622, a contour detector 624 detects a facial contour relevant to forming a custom-fit PPE component. Contour detector 624 may detect a facial contour based on light differences in the sensor signal indicative of facial contours, in one embodiment or may detect facial contours by comparative analysis to a database of faces, in one embodiment, or may utilize another suitable method.

Feature mapper 626, based on detected contours, maps the face of the user. In some embodiments, only contours relevant to the PPE being formed are mapped, e.g. the nose area for a nose foam. Facial mapper 626 may, for example, detect dimensions of the user's nose, particularly in the area where a respiratory protection device will sit.

Scanning system 620 may also include other functionality 628. For example, in embodiments where scanning system 620 includes a camera 622, other function 628 may include augmented reality overlay functionality that illustrates, for a user, where the respiratory protection device will sit on their face, or other pertinent information.

Scanning system 620 also includes a scanning controller 627 that controls operation of scanner 622, contour detector 624, feature mapper 626 and other functionality 628. For example, scanner 622 may only be powered on or activated to capture sensor signals when triggered, e.g. by motion, by user input, or another trigger, to conserve battery and processing power, in some embodiments.

Nose foam selection system 600 includes a fit detection indicator 660, in some embodiments. For example, in an industrial setting, it may be necessary to retrieve information about what PPE a user has successfully passed a fit test for, and what they have not. For example, a healthcare worker may not be able to initiate a nose foam selection process for PPE they are not qualified to use, in some embodiments, such fit test indications may be stored in storage 662. Indications of whether a user has passed a fit test, and which fit test, for example as specified by Appendix A to § 1910.134 FIT TESTING PROCEDURES (MANDATORY), may be stored in fit test indication store 664. Fit detection indicator 660 may contain other features or information 668 as well.

In other embodiments, a user may be able to re-print a fully custom nose foam without undergoing a scanning process, for example if scan data, contour data or facial mapping data is stored within storage 662. In some embodiments, a CAD, STL or other relevant printing file is stored in storage 662 for such retrieval.

System 600 also includes nose foam provider 630. Nose foam provider 630 may, using a feature receiver 635, receive identified feature information from scanning system 620. Cluster analyzer 636 may, based on the received feature information, determine which cluster or clusters 614 the user best matches. For example, while hundreds of clusters 614 may be within database 610, a retail or industrial setting may only have ten varieties. Template selector 638 may compare the best match or matches to the on-hand nose foam templates and select a best fit based on availability.

In other embodiments, nose foam provider 630 provides a fully custom nose foam for a user. A material selector 632 may select a material, for example either open or closed cell, based on a user's preference. In some embodiments, multiple colors of foam, or foam precursor, is available and color selector 634 may select a color based on a received user preference. A dimension selector 642 may select a width of the contour, e.g. the distance covered on a user's nose, as well as a length of the contour, e.g. how far along the cheekbone the nose foam extends. Based on the selections by material selector 632, color selector 634, template selector 638, and dimension selector 642, a custom nose foam may be created, either by cutting the contour out of a foam, using foam cutter 646, or by using a printer 648. Foam cutter 646 may have access to a number of foam options, and may be able to rapidly cut a contour out of foam as desired.

Nose foam provider 630 may alternatively include a printer 648, a term used loosely to include rapid forming of a PPE component. Printing may include rapid additive manufacturing methods, for example to print a mold or to print a template that can be used by a user to cut their own nose foam.

Cutter 646 or printer 648 may receive a CAD file, STL file or other suitable instruction file. The file may be sent from scanning system 620, for example by controller 627 or controller 602. A file may also be received from storage 662, or from a remote storage source.

System 600 may also include other functionality 644, for example a communication component which may communicate scanning data, fit detection information, printing files, etc. to another source.

System 600 may be an interactive system with a graphical user interface 650, generated by a graphical user interface generator 640. GUI 650 may, for example, display an image 652, for example of the user's face. The GUI 650 may also present a nose foam overlay 654, which may illustrate where the nose foam will sit on the user's face. The GUI 650 may also present instructions 656 to the user for how to apply the nose foam and/or the respiratory protection device for an improved seal fit. GUI 650 may also present other information 658 to a user, for example information on their selected respiratory protection device or other relevant information.

Figure 7A:
FIGS. 7A-7E illustrate a mobile application for form-fitting a respiratory protection device to a wearer in accordance with embodiments herein.

FIGS. 7A-7E illustrate a process for custom fitting a respiratory protection device to a user's face in accordance with embodiments herein. As illustrated in FIG. 7A, the information needed for selecting or printing a nose foam may be collected using a mobile computing device, for example through an application on a mobile smartphone. FIGS. 7A-7E illustrate one example walkthrough of how a user may interact with such an application. However, it is expressly contemplated that FIGS. 7A-7E are merely one example embodiment, and that systems and methods herein may be implemented in other fashions.

As illustrated in FIG. 7A, a user may open a mobile application on a mobile phone 700 and see landing page 702. The user may start with a respiratory protection device already selected. In some embodiments, it is expressly contemplated that, based on a facial scan or fit test information, a particular model of respiratory protection device may be suggested. A mobile phone 700 may present a request, using the phone's user interface, for the user to enter information about a selected PPE model. For example, a barcode reader may be presented with the prompt, or a text box to enter a make or model of a selected PPE.

Figure 7B:
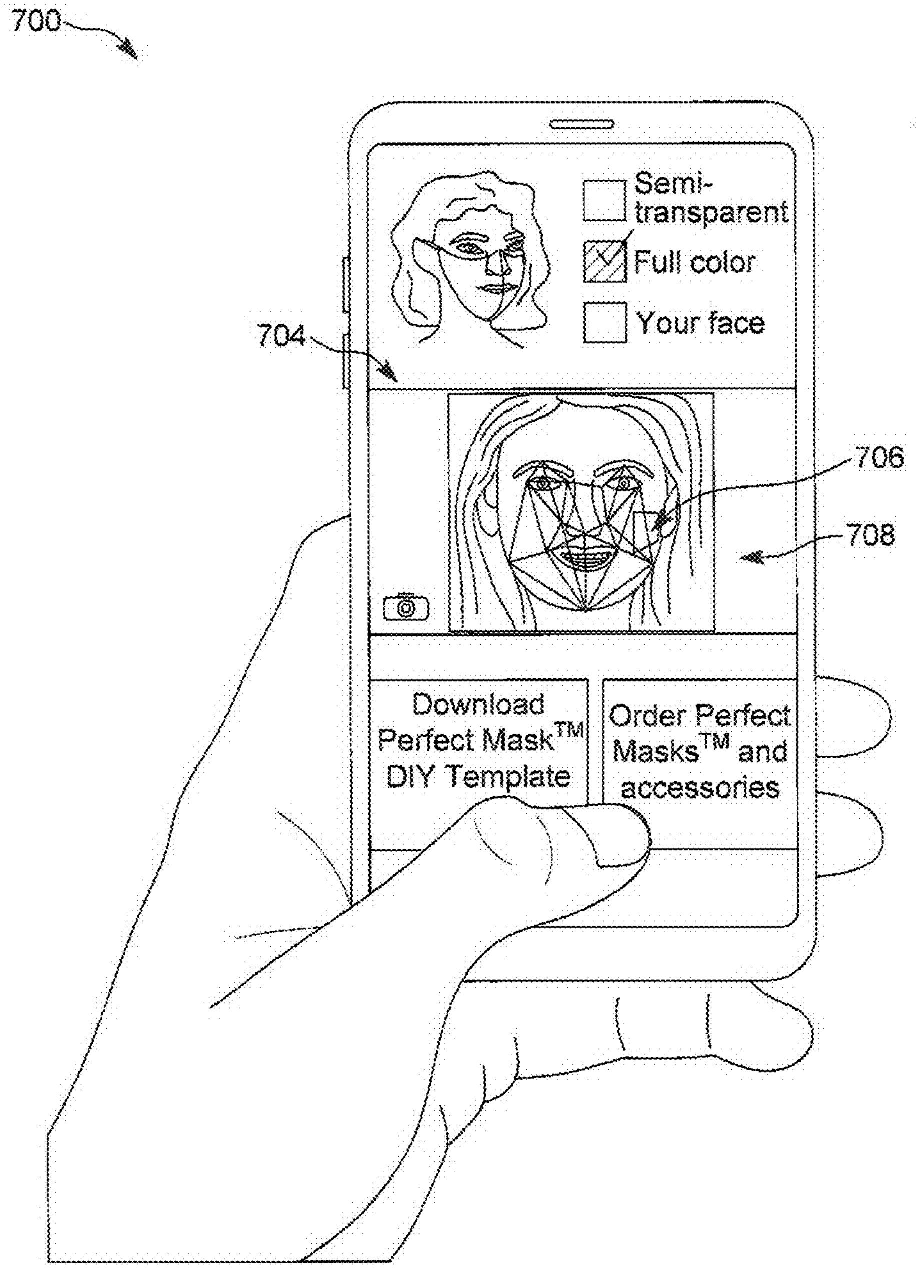

However, as illustrated in FIG. 7B, it is also expressly contemplated that a mobile phone application may also provide information about which respiratory protection device may best fit a user's face. Profile images also may be taken.

FIG. 7B illustrates a process 704 for obtaining the necessary images of the user's face. In some embodiments, a single image is sufficient. In other embodiments, the application may guide the user into providing the images necessary to obtain sufficient facial mapping. In one embodiment, a user may place a fiducial 706 on or near their face. Fiducial 706 may be any item with dimensions known by the system. Illustrated in FIG. 7B is a post-it® note. The user's image 708 is also shown in FIG. 7B, with an overlay of scanning results.

The system may automatically reject images, in some embodiments, that are too blurry or insufficient for mapping. While not illustrated in FIGS. 7A-7E, it may be necessary to take an image of a user wearing a respiratory protection device. However, in some embodiments, only images of a user's face without a respiratory protection device are required. For example, in a retail setting it may be preferable for a user to not need to open a respiratory protection device prior to its purchase.

Figure 7C:
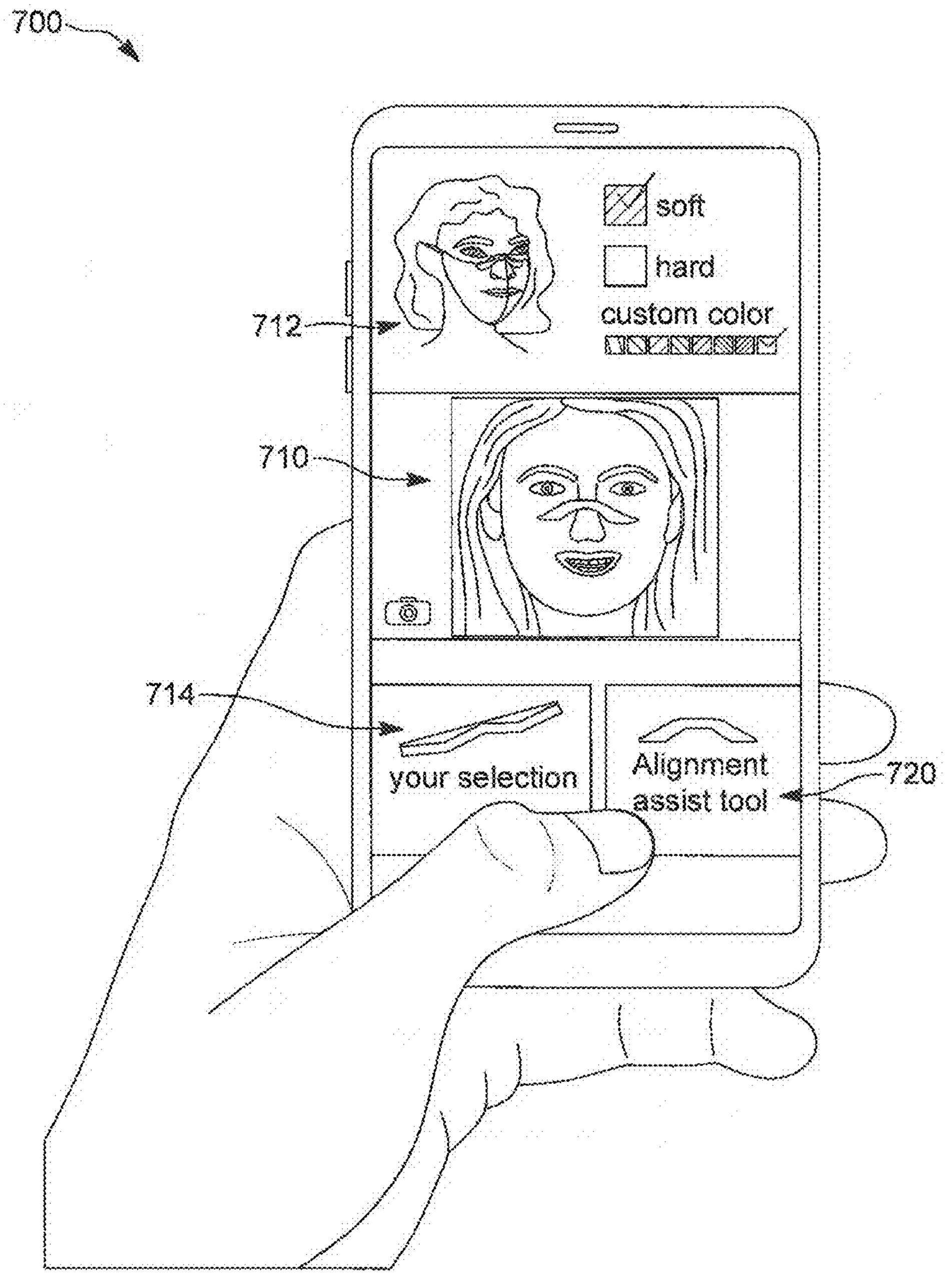

FIG. 7C illustrates how a user may use a mobile application to further customize a nose foam. However, it is expressly contemplated that, in some embodiments, the app may only suggest which template of those available in a retail setting is the best fit based on the user's facial features and material requests. For example, a user may be able to select color or foam firmness using a material selection interface 712. The user may also be able to see a current selection 714 and an augmented reality view 710 may be presented, showing a user where the nose foam should be placed. An alignment assist tool 720 may further walk the user through how to align the nose foam on their face or on a respiratory protection device.

Figure 7D:
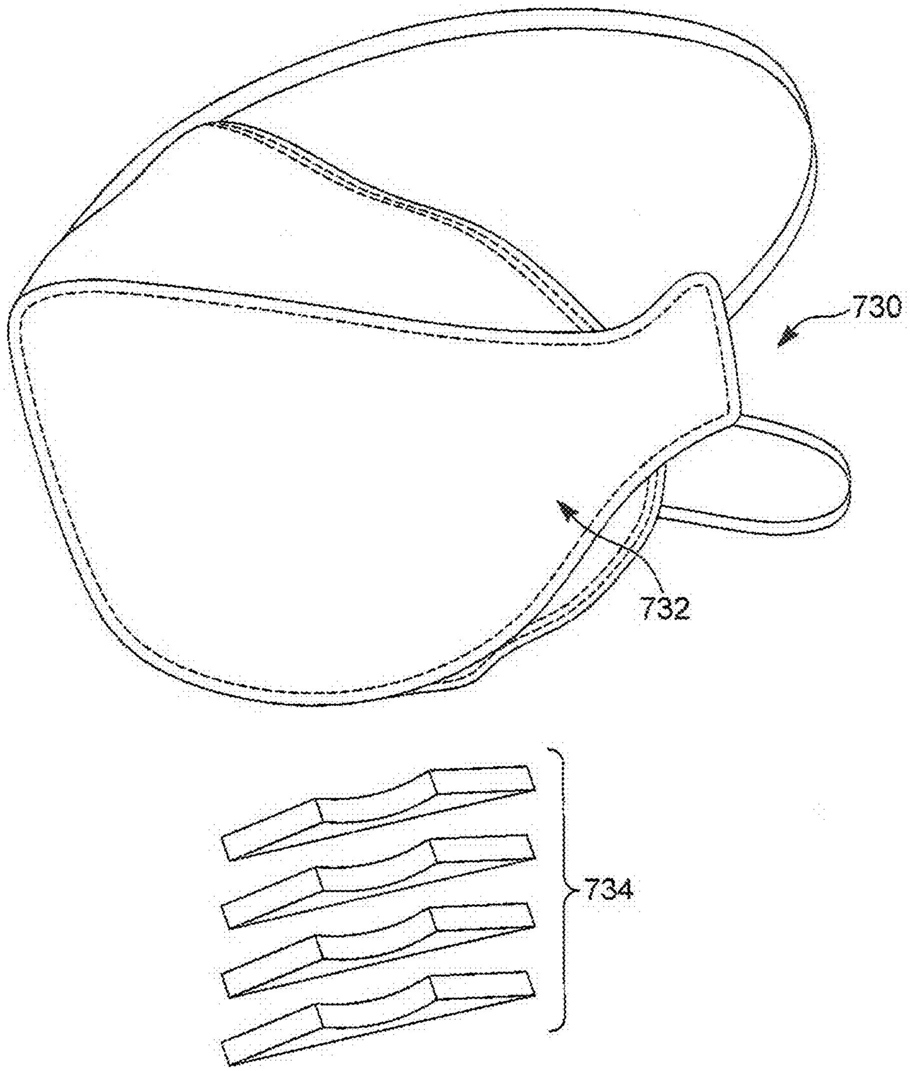

FIG. 7D illustrates an example of a kit 730 that a user may purchase. However, it is expressly contemplated that a user may purchase a respiratory protection device, such as respirator 732, separately from nose foam templates 734. Nose foam templates 734 may come with an attachment mechanism in place, for example the hook portions of a hook and loop connection system, or adhesive strips for attachment to either the respiratory protection device or to the user's face. It is also expressly contemplated that the kit may come with instructions for placing the nose foam templates on the respiratory protection device.

Figure 7E:
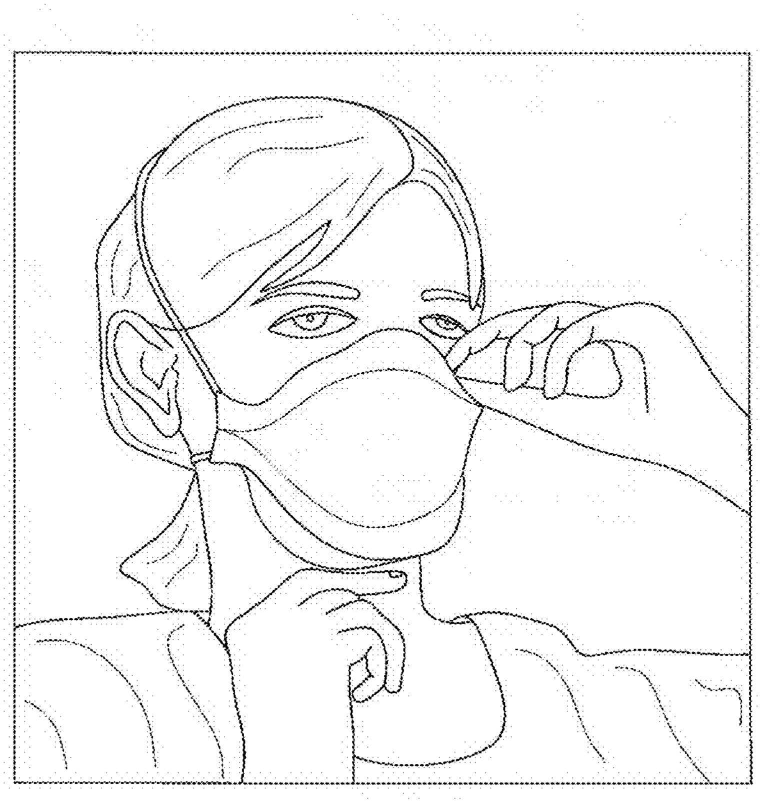

FIG. 7E illustrates a user 750 placing the respiratory protection device on their face, according to instructions.

As discussed herein, it is expressly contemplated that nose foam templates may be useful for a variety of face protection products. For example, while respirators are illustrated in figures herein, the same contoured insert selection process described herein may be applied to respiratory protection devices, such as facial coverings, available for the general public. Many consumer level masks (either reusable cloth or disposable paper surgical-style) lack nose bridges that adequately ensure fit in the region between the nose and cheek bones. Custom inserts that could be generically compatible with consumer centric devices may provide benefits for both fit and for reduction of fogging of eyewear worn with cloth masks.

With the current mandates for the general public to wear respiratory protection devices while indoor public spaces, to allow greater accessibility for those who might not have a retailer nearby, and to bypass retail set ups of digital-out-of-home experiences, it is also expressly envisioned that systems, such as mobile phone applications, may provide an alternate user experience for the service within the comfort of one's own home.

The user interfaces with a face measuring digital service tool by downloading an app or visiting a website. The face measuring digital service measures the user's face to ensure a custom fitting respiratory protection device. The user may scan their own face by taking a picture with their device to instantly create a 3D map sufficient for comparison to facial clusters, e.g. those stored in facial contour database 610. The tool recommends the following based on the user's unique face shape, with the option to ship the respiratory protection device and/or nose foam components directly to the user. The application may be able to provide:

1) A recommendation of most appropriate respiratory protection device type option by intended use
2) A recommendation of most appropriate respiratory protection device size option according to face scan, or
3) A recommendation of most appropriate nose foam component option according to face scan As discussed with respect to FIG. 7, accurate 3D face mapping triangulation can be ensured in a number of ways: using universal analog scalar tools for calibration, digital landmark identification, analog measuring tapes, digital ruler app integration, structured light scanning, or others as inputs to create the depth image.

Figure 8:
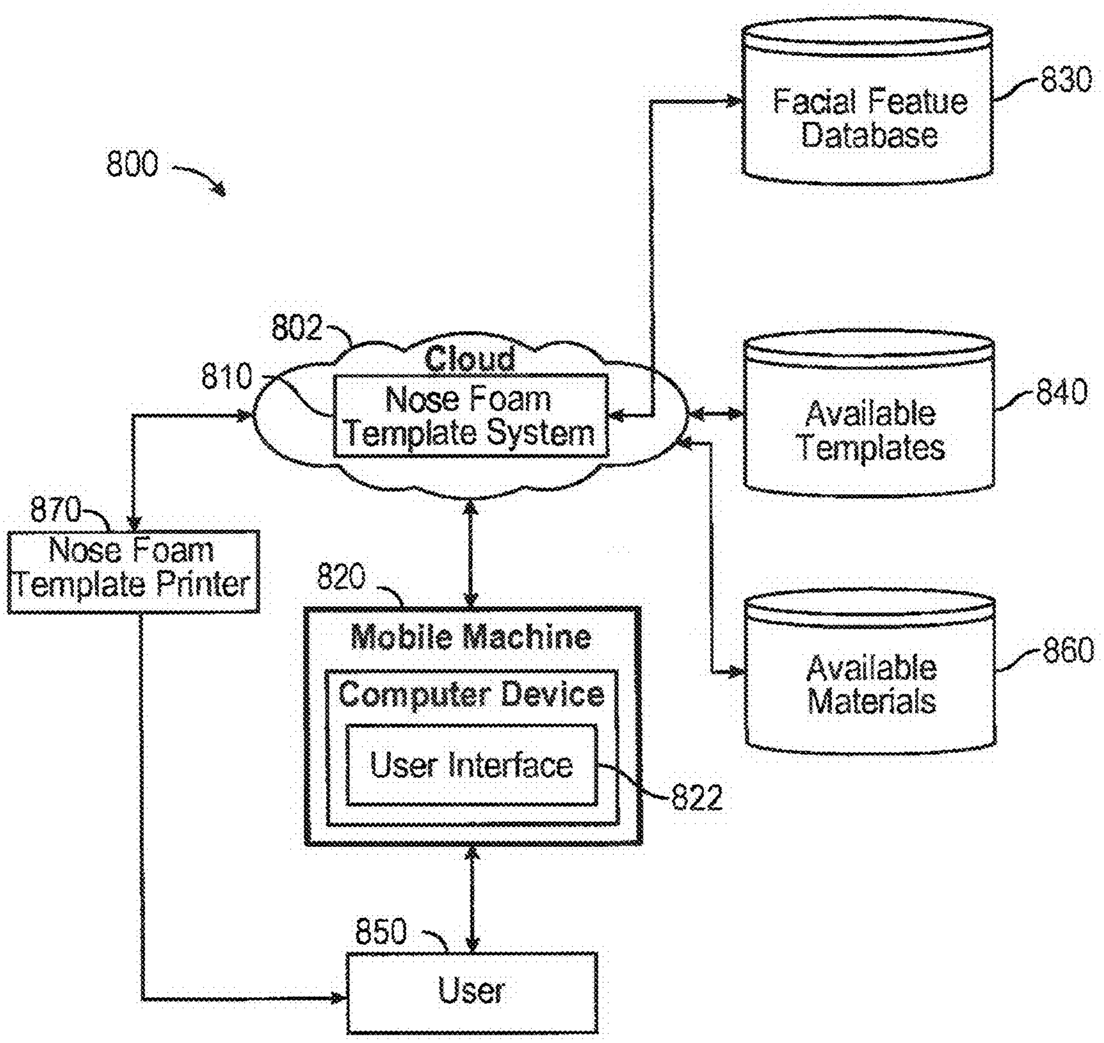
FIG. 8 is a nose foam template system architecture.

FIG. 8 is a block diagram of a nose foam template system architecture. The remote server architecture 800 illustrates one embodiment of an implementation of nose foam template system 810. As an example, remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-7 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 8, some items are similar to those shown in earlier figures. FIG. 8 specifically shows that a nose foam template system can be located at a remote server location 802. Therefore, computing device 820 accesses those systems through remote server location 802. User 850 can use computing device 820 to access user interfaces 822 as well. For example, a user 850 may be a user desiring a better fitting respiratory protection device while sitting at home, and interacting with an application on the user interface 822 of their smartphone 820, or laptop 820, or other computing device 820.

FIG. 8 shows that it is also contemplated that some elements of systems described herein are disposed at remote server location 802 while others are not. By way of example, storage 830, 840 or 860 or a nose foam template printer 870 can be disposed at a location separate from location 802 and accessed through the remote server at location 802. Regardless of where they are located, they can be accessed directly by computing device 820, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. This may allow a user 850 to interact with system 810 through their computing device 820, to order a nose foam template (either fully or semi-customized) for delivery or pickup.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 9:
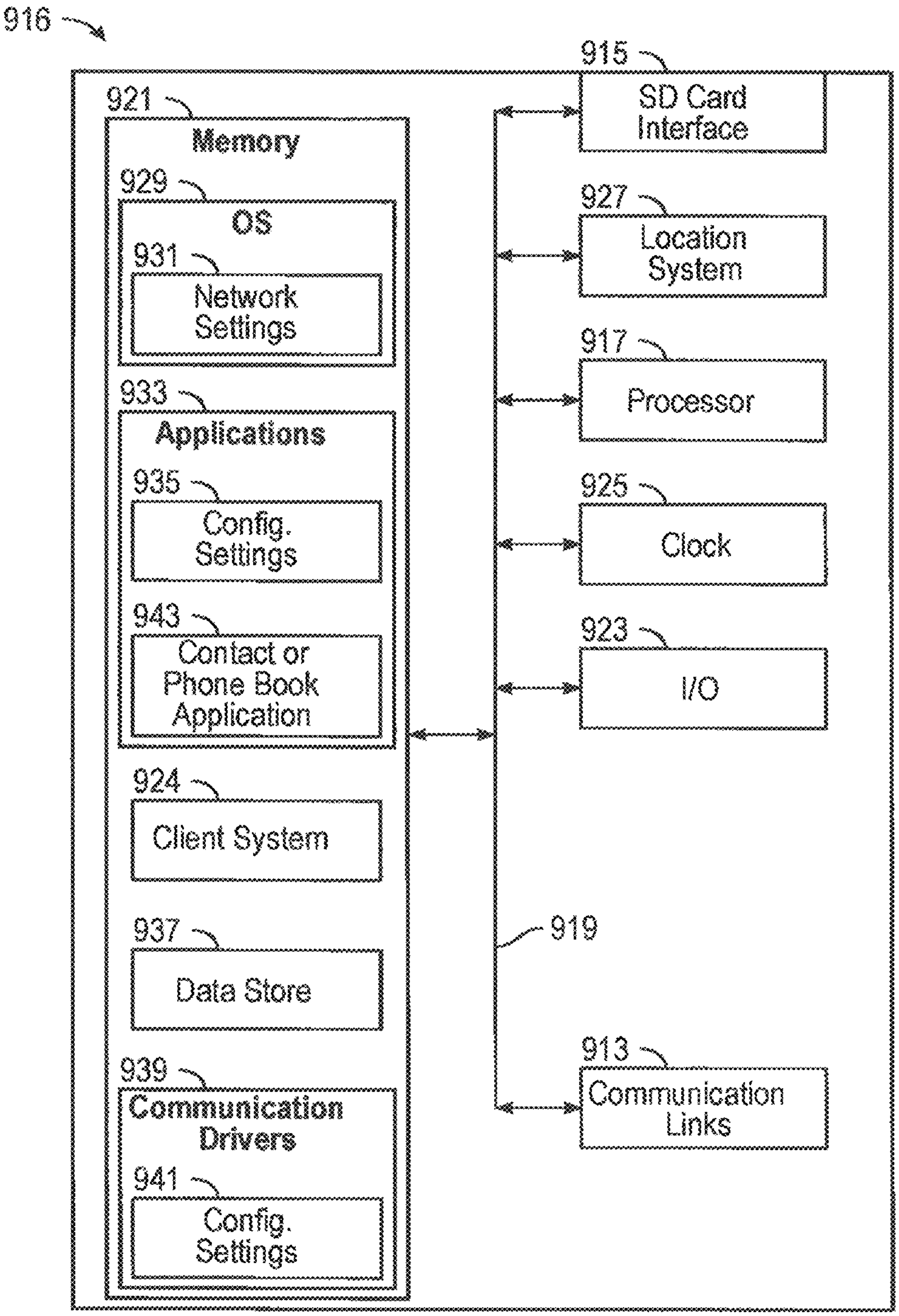
FIGS. 9-11 illustrate example devices that can be used in embodiments herein.
Figure 10:
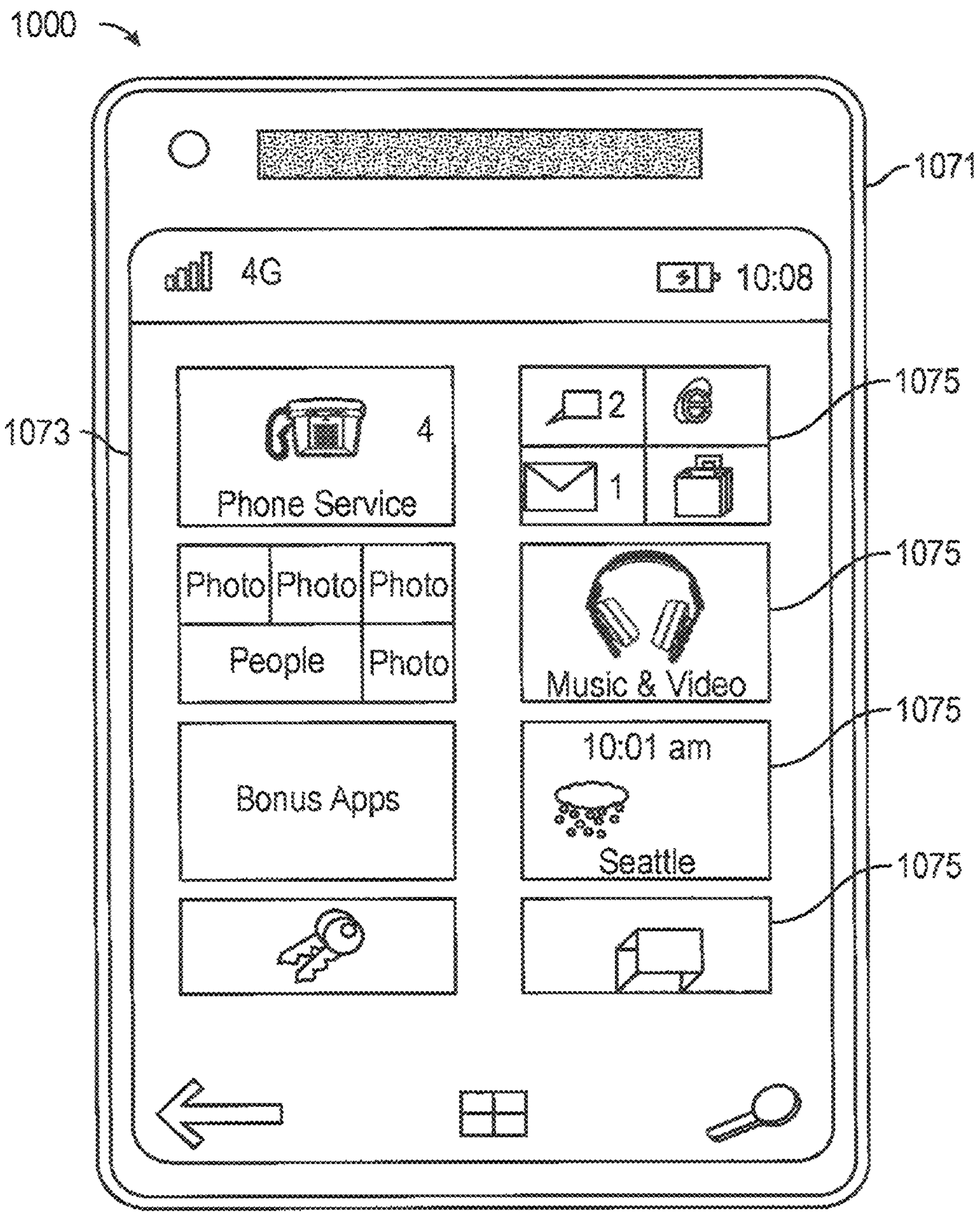
Figure 11:
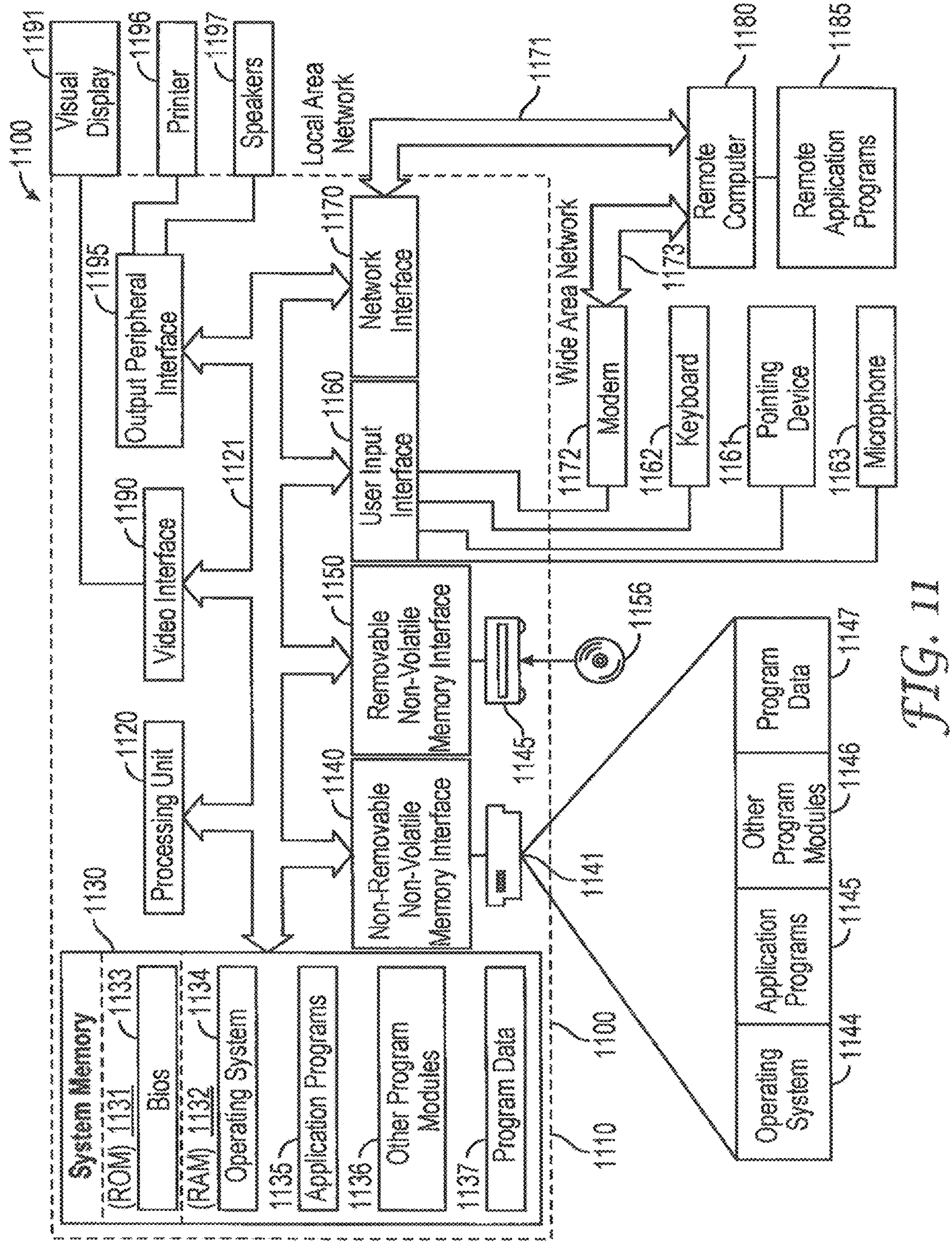

FIGS. 9-11 illustrate example devices that can be used in the embodiments shown in previous Figures. FIG. 9 illustrates an example mobile device that can be used in the embodiments shown in previous Figures. FIG. 9 is a simplified block diagram of one illustrative example of a handheld or mobile computing device that can be used as either a worker's device or a supervisor/safety officer device, for example, in which the present system (or parts of it) can be deployed. For instance, a mobile device can be deployed in the operator compartment of computing device for use in generating, processing, or displaying the data.

FIG. 9 provides a general block diagram of the components of a mobile cellular device 916 that can run some components shown and described herein. Mobile cellular device 916 interacts with them or runs some and interacts with some. In the device 916, a communications link 913 is provided that allows the handheld device to communicate with other computing devices and under some embodiments provides a channel for receiving information automatically, such as by scanning. Examples of communications link 913 include allowing communication though one or more communication protocols, such as wireless services used to provide cellular access to a network, as well as protocols that provide local wireless connections to networks.

In other examples, applications can be received on a removable Secure Digital (SD) card that is connected to an interface 915. Interface 915 and communication links 913 communicate with a processor 917 (which can also embody a processor) along a bus 919 that is also connected to memory 921 and input/output (I/O) components 923, as well as clock 925 and location system 927.

I/O components 923, in one embodiment, are provided to facilitate input and output operations and the device 916 can include input components such as buttons, touch sensors, optical sensors, microphones, touch screens, proximity sensors, accelerometers, orientation sensors and output components such as a display device, a speaker, and or a printer port. Other I/O components 923 can be used as well.

Clock 925 illustratively comprises a real time clock component that outputs a time and date. It can also provide timing functions for processor 917.

Illustratively, location system 927 includes a component that outputs a current geographical location of device 916. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 921 stores operating system 929, network settings 931, applications 933, application configuration settings 935, data store 937, communication drivers 939, and communication configuration settings 941. Memory 921 can include all types of tangible volatile and non-volatile computer-readable memory devices. It can also include computer storage media (described below). Memory 921 stores computer readable instructions that, when executed by processor 917, cause the processor to perform computer-implemented steps or functions according to the instructions. Processor 917 can be activated by other components to facilitate their functionality as well. It is expressly contemplated that, while a physical memory store 921 is illustrated as part of a device, that cloud computing options, where some data and/or processing is done using a remote service, are available.

FIG. 10 shows that the device can also be a smart phone 1071. Smart phone 1071 has a touch sensitive display 1073 that displays icons or tiles or other user input mechanisms 1075. Mechanisms 1075 can be used by a user to run applications, make calls, perform data transfer operations, etc. In general, smart phone 1071 is built on a mobile operating system and offers more advanced computing capability and connectivity than a feature phone. Note that other forms of the devices are possible.

FIG. 11 is one example of a computing environment in which elements of systems and methods described herein, or parts of them (for example), can be deployed. With reference to FIG. 11, an example system for implementing some embodiments includes a general-purpose computing device in the form of a computer 1110. Components of computer 1110 may include, but are not limited to, a processing unit 1120 (which can comprise a processor), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to systems and methods described herein can be deployed in corresponding portions of FIG. 11.

Computer 1110 typically includes a variety of computer readable media. Computer readable media can be any available media that can be accessed by computer 1110 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random-access memory (RAM) 1132. A basic input/output system 1133 (BIOS) containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 10 illustrates operating system 1134, application programs 1135, other program modules 1136, and program data 1137.

The computer 1110 may also include other removable/non-removable and volatile/nonvolatile computer storage media. By way of example only, FIG. 11 illustrates a hard disk drive 1141 that reads from or writes to non-removable, nonvolatile magnetic media, nonvolatile magnetic disk 1152, an optical disk drive 1155, and nonvolatile optical disk 1156. The hard disk drive 1141 is typically connected to the system bus 1121 through a non-removable memory interface such as interface 1140, and optical disk drive 1155 are typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICS), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1110 through input devices such as a keyboard 1162, a microphone 1163, and a pointing device 1161, such as a mouse, trackball or touch pad. Other input devices (not shown) may include a joystick, game pad, satellite receiver, scanner, a gesture recognition device, or the like. These and other input devices are often connected to the processing unit 1120 through a user input interface 1160 that is coupled to the system bus but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections, such as a Local Area Network (LAN) or Wide Area Network (WAN) to one or more remote computers, such as a remote computer 1180. The computer may also connect to the network through another wired connection. A wireless network, such as WiFi may also be used.

When used in a LAN networking environment, the computer 1110 is connected to the LAN 871 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 11 illustrates, for example, that remote application programs 1185 can reside on remote computer 1180.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Here, the exemplary embodiments of the present invention have been described in detail, but it should be understood that the present invention is not limited to the specific embodiments described and illustrated in detail above. Those skilled in the art can make various variations and variants of the present invention without departing from the gist and scope of the present invention. All these variations and variants fall within the scope of the present invention. Moreover, all components described here can be replaced by other technically equivalent components.

A nose foam for a respiratory protection device is presented that includes a first cheek portion, a second cheek portion, and a nose bridge portion. The first and second cheek portions are both wider than the nose bridge portion. The nose foam is selected for the respiratory protection device by a computer-based respiratory protection device selection system, based on a facial feature of a wearer.

The nose foam may be implemented such that the first cheek portion is coupled to the nose bridge portion, and the nose bridge portion is coupled to the second cheek portion.

The nose foam may be implemented such that the first cheek portion, the second cheek portion and the nose bridge portion are compliant.

The nose foam may be implemented such that a foam body includes the first cheek portion, second cheek portion and the nose bridge portion.

The nose foam may be implemented such that the foam body includes a silicone foam, a synthetic block copolymer based-foam, an olefin foam, polypropylene or a polyurethane foam.

The nose foam may be implemented such that the foam body is formed of an olefin foam.

The nose foam may be implemented such that the nose foam is symmetrical.

The nose foam may be implemented such that the respiratory protection device is metal free.

The nose foam may be implemented such that the respiratory protection device includes a deformable nose clip.

The nose foam may be implemented such that the nose foam includes a body length that is longer than a length of the deformable nose clip.

The nose foam may be implemented such that the nose foam includes a respiratory protection device attachment side and a face contacting side.

The nose foam may be implemented such that the nose foam includes an adhesive strip on the respiratory protection device attachment side.

The nose foam may be implemented such that the nose foam includes an adhesive strip on the face contacting side.

The nose foam may be implemented such that the adhesive strip includes a pressure sensitive adhesive selected from an acrylic, a natural rubber, a synthetic rubber, a silicone, a polyalphaolefin and synthetic block copolymers.

The nose foam may be implemented such that the adhesive strip includes a pressure sensitive adhesive, a protective liner and optionally a backing.

The nose foam may be implemented such that the first and second cheek portions and the nose bridge portion are custom-sized based on the facial feature of the wearer.

The nose foam may be implemented such that the nose foam is custom cut out of a sheet of foam based on the facial feature of the wearer.

The nose foam may be implemented such that the nose foam is molded based on the facial feature of the wearer using a moisture curable foam, a low melting thermoplastic backed foam laminate, or a combination thereof.

The nose-foam may be implemented such that the nose foam includes polyolefin or polypropylene.

The nose foam may be implemented such that the nose foam includes a foam body with an open cell structure.

The nose foam may be implemented such that the nose foam includes a foam body with a closed cell structure.

The nose foam may be implemented such that the respiratory protection device is a respirator.

The nose foam may be implemented such that the respiratory protection device is a cloth-based face covering.

A nose-foam is presented that includes a compressible foam strip with a length and a width. The length is less than an ear-to-ear distance of a face of the user. The nose foam has a contour. The contour t is selected by a computer-based system that, based on a best-match comparison to a facial feature of the user, selects the contour from a plurality of contours.

The nose foam may be implemented such that the compressible foam strip has a strip length, and wherein the length is sized to cover at least a nose profile of the user.

The nose foam may be implemented such that the width is a variable width. The variable width includes a local minima, a first local maxima and a second local maxima.

The nose foam may be implemented such that the local minima is between the first local maxima and the second local maxima.

The nose foam may be implemented such that the facial feature includes a bridge of a nose of the user. A difference between the first local maxima and the local minima is related to a height of the bridge of the nose of the user.

The nose foam may be implemented such that the foam body includes a silicone foam, a synthetic block copolymer-based foam, an olefin foam, or a polyurethane foam.

The nose foam may be implemented such that the foam body is made only from olefin materials.

The nose foam may be implemented such that the nose foam is symmetrical.

The nose foam may be implemented such that the nose foam includes a respiratory protection device attachment side and a face contacting side.

The nose foam may be implemented such that the nose foam includes an adhesive strip on the respiratory protection device attachment side.

The nose foam may be implemented such that the nose foam includes an adhesive strip on the face contacting side.

The nose foam may be implemented such that the adhesive strip includes a pressure sensitive adhesive selected from an acrylic, a natural rubber, a synthetic rubber, a silicone, a polyalphaolefin and synthetic block copolymers.

The nose foam may be implemented such that the first and second cheek portions and the nose bridge portion are custom-sized based on the facial feature of the wearer.

The nose foam may be implemented such that the nose foam is custom cut out of a sheet of foam based on the facial feature of the wearer.

The nose foam may be implemented such that the nose foam is molded based on the facial feature of the wearer using a moisture curable foam, a low melting thermoplastic backed foam laminate, or a combination thereof.

The nose foam may be implemented such that the nose foam includes a foam body with an open cell structure.

The nose foam may be implemented such that the nose foam includes a foam body with a closed cell structure.

A respiratory protection device with improved fit is presented that includes a material shaped to cover a nose and mouth of a wearer. The device also includes a compressible nose foam configured to cover the bridge of a nose of the wearer. The nose foam provides a seal between the material and the nose. The nose foam includes a contour. The nose foam contour is generated by computer-based contour selection system based on a detected facial feature of the wearer.

The respiratory protection device may be implemented such that a tension device to retain the respiratory protection device on the wearer.

The respiratory protection device may be implemented such that the respiratory protection device is a metal-free respiratory protection device.

The respiratory protection device may be implemented such that the respiratory device includes a face-covering portion made from polyolefin.

The respiratory protection device may be implemented such that the respiratory device is made from only olefin-based materials.

The respiratory protection device may be implemented such that the respiratory protection device includes a deformable nose clip.

The respiratory protection device may be implemented such that the respiratory protection device is a fabric face mask.

The respiratory protection device may be implemented such that the fabric is a nonwoven fabric.

The respiratory protection device may be implemented such that the fabric is a woven fabric.

The respiratory protection device may be implemented such that the respiratory protection device is a respirator.

The respiratory protection device may be implemented such that the tension device includes a stretchable material configured to wrap around the head of the wearer.

The respiratory protection device may be implemented such that the tension device includes ties configured to be tied around the head of the wearer.

The respiratory protection device may be implemented such that the tension device includes a pair of ear loops.

The respiratory protection device may be implemented such that the compressible nose foam is provided based on a scan of the face of the wearer.

The respiratory protection device may be implemented such that the compressible nose foam is selected from a plurality of available nose foams based on a best fit match of the scanned facial feature to the nose foam contour.

The respiratory protection device may be implemented such that the compressible nose foam is molded based on the scan of the face of the wearer.

The respiratory protection device may be implemented such that the compressible nose foam is custom cut based on the scan of the face of the wearer.

The respiratory protection device may be implemented such that the compressible nose foam is custom cut based on a template formed from the scan of the face of the wearer.

The respiratory protection device may be implemented such that the compressible nose foam is custom-molded.

The respiratory protection device may be implemented such that the nose foam contour is based on a feature of the respiratory protection device.

The respiratory protection device may be implemented such that the material includes a filter layer.

A method of providing a nose foam for an improved respiratory protection device fit is presented that includes scanning a face of a wearer using one or more scans. Scanning provides a facial contour of a nose area of the wearer. The method also includes providing a nose foam template based on the facial contour. The method also includes providing instructions for applying the nose foam template to a respiratory protection device.

The method may be implemented such that it includes selecting a type of respiratory protection device.

The method may be implemented such that the respiratory protection device is selected based on the facial contour of the nose area.

The method may be implemented such that the nose foam template is selected from a plurality of nose foam templates. The nose foam template is selected based on a best match comparison of the facial contour to the plurality of nose foam templates.

The method may be implemented such that the plurality of nose foam templates includes a set of available nose foam templates.

The method may be implemented such that the best match comparison is also based on a user input. The user input includes a foam density: a foam color, or a model of respiratory protection device.

The method may be implemented such that scanning the face of the wearer includes imaging the face of the wearer using a camera.

The method may be implemented such that scanning the face of the wearer includes scanning with a 2D scanner, a 3D scanner, a scattered light system, or a LIDAR system.

The method may be implemented such that the nose foam template is custom cut to match the facial contour.

The method may be implemented such that scanning includes mapping the nose area.

The method may be implemented such that scanning includes mapping a chin area of the wearer.

The method may be implemented such that scanning includes placement of a fiducial.

The method may be implemented such that scanning includes obtaining a first image of the wearer making a first facial expression and a second image of the wearer making a second facial expression.

The method may be implemented such that it includes conducting a fit test of the wearer wearing the respiratory protection device.

The method may be implemented such that the nose foam template includes a silicone foam, a synthetic block copolymer-based foam, an olefin foam, a polypropylene foam or a polyurethane foam.

The method may be implemented such that the respiratory protection device is made from only olefin materials.

The method may be implemented such that the nose foam template is symmetrical.

The method may be implemented such that the nose foam template includes a respiratory protection device attachment side and a face contacting side.

The method may be implemented such that the nose foam template includes an adhesive strip on the respiratory protection device attachment side.

The method may be implemented such that the nose foam template includes an adhesive strip on the face contacting side.

The method may be implemented such that the adhesive strip includes a pressure sensitive adhesive selected from an acrylic, a natural rubber, a synthetic rubber, a silicone, a polyalphaolefin and synthetic block copolymers.

The method may be implemented such that the adhesive strip includes a pressure sensitive adhesive, a protective liner and optionally a backing.

The method may be implemented such that the nose foam template includes an open cell structure.

The method may be implemented such that the nose foam template includes a closed cell structure.

A system for selecting a nose foam for an improved respiratory protection device fit is presented that includes a scanning system configured to take at least one scan of a face of a user and identify a facial contour. The system may also include a nose foam selector that, based on the identified facial contour, searches a facial contour database for a match to a nose foam template and, based on a detected match, provides the nose foam template. The system also includes a graphical user interface generator that generates a graphical user interface on a display that provides an image of the face of the user and instructions for the user to apply the nose foam template to a respiratory protection device to provide the respiratory protection device with an improved fit.

The system may be implemented such that the scanning system includes a camera.

The system may be implemented such that the system is a mobile application on a computing device that, when actuated, actuates the camera to capture an image of the user's face, and wherein, based on the captured image, the facial contour is identified.

The system may be implemented such that the facial contour database includes a database of available nose foam templates.

The system may be implemented such that a respiratory protection device selector selects a respiratory protection device product for the user.

The system may be implemented such that the respiratory protection device selector selects the respiratory protection device product based on a preference indicated by the user.

The system may be implemented such that the respiratory protection device selector selects the respiratory protection device product based on the scanned face of the user.

The system may be implemented such that the respiratory protection device selector selects the respiratory protection device based on a fit test result for the user.

The system may be implemented such that the nose foam template is provided with an adhesive strip.

The system may be implemented such that the nose foam template is provided with a mechanical fastener tape.

The system may be implemented such that the nose foam template is provided with a hook portion of a hook and loop system.

The system may be implemented such that the graphical user interface provides the image of the face of the user with an overlay indicating where the nose foam template should fit on the face of the user.

A filtering facepiece respirator is presented that includes a facial covering portion including an olefin-based material shaped to fit a face of a wearer. The facial covering portion includes a filter component and a seal component. The seal component includes an olefin foam shaped to fit the face. The respirator also includes a tension mechanism that applies tension to the facial covering portion, urging the facial covering portion against the face. The tension mechanism includes an olefin-based material. The filtering facepiece respirator is metal free.

The filtering facepiece respirator may be implemented such that the facial contacting portion is a custom sized material based on a face shape of the wearer.

The filtering facepiece respirator may be implemented such that it includes a sealing feature, wherein the sealing feature includes a second olefin material.

The filtering facepiece respirator may be implemented such that the facial covering portion is custom printed, using an additive manufacturing technique, and wherein the face shape includes a detected facial shape indication.

The filtering facepiece respirator may be implemented such that the facial shape indication is detected by a facial scanning device.

The filtering facepiece respirator may be implemented such that the facial covering portion is rapidly printed in response to scans received from the facial scanning device.

The filtering facepiece respirator may be implemented such that the facial shape indication is a facial contour of a nose area.

The filtering facepiece respirator may be implemented such that the facial contacting portion is thermoformed.

The filtering facepiece respirator may be implemented such that the shape of the facial contacting portion is selected from a plurality of templates based on a detected facial contour of the wearer.

A method of making a filtering facepiece respirator is presented that includes forming a face-covering portion from a first olefin material. The method also includes forming a custom gasket from a second olefin material. The custom gasket is customized based on a known facial feature of a user. The method also includes coupling the custom gasket to the face-covering portion using a metal-free coupling. The method also includes attaching a tightening element to the face-covering portion or the custom gasket. The filtering facepiece respirator is metal free.

The method may be implemented such that coupling includes ultrasonic welding.

The method may be implemented such that coupling includes adhesive.

The method may be implemented such that coupling includes melting.

The method may be implemented such that the face-covering portion includes 3D printed olefin filament.

The method may be implemented such that the face-covered portion includes a thermoformed olefin-based material.

The method may be implemented such that the custom gasket includes an olefin foam.

The method may be implemented such that the filtering face respirator is formed only of olefin-based materials.

The method may be implemented such that it includes scanning a face of a user of the filtering facepiece respirator, detecting a facial contour. The custom gasket is formed based on the detected facial contour.

The method may be implemented such that the custom gasket is selected from a plurality of template gaskets based on a scan of a face.

The method may be implemented such that the custom gasket is selected from one of a plurality of templates based on a best fit analysis of the scan.

EXAMPLES

Example 1: Selecting a Best-Fitting Nose Foam

Step 1: The user utilizes a smart phone to scan a bar code on 3M respirator box in retail setting for example (occupational setting is also possible such as in a hospital or construction site).

Step 2: The application instructs the user to place the smart phone is a specific holder for example on the retail shelf next to a respirator display.

Step 3: The application instructs the user how to pose to get the most precise scan of the user's face, and collects images (e.g. from an Android phone) or depth data (e.g. pointcloud data from iPhones) of the region of interest, the user's nose area, instructs the user to stand on a specific marker on the floor a predetermined distance from the smart phone. This may include frontal and profile images.

Step 4: The application instructs the user how to pose to get the most precise scan of the user's face, and collects images (e.g. from an Android phone) or depth data (e.g. pointcloud data from an iPhone) of the region of interest, the user's nose area, and the algorithm determines best fitting respirator model or nose foam Step 5: The user is instructed to purchase the best fitting product which is ideally available on the shelf. The application can also show the user exactly how to install the selected nose foam on the selected respirator (for example, with a 5 or 10 second video). Alternatively, the user can take a photo after nose foam installation for the application to verify it has been correctly placed and installed.

Step 6: The application may return rank order of best fitting respirator model or nose foam size giving the user more than one option.

Example 2: Foam Respirator Gasket Examples

Figure 12A:
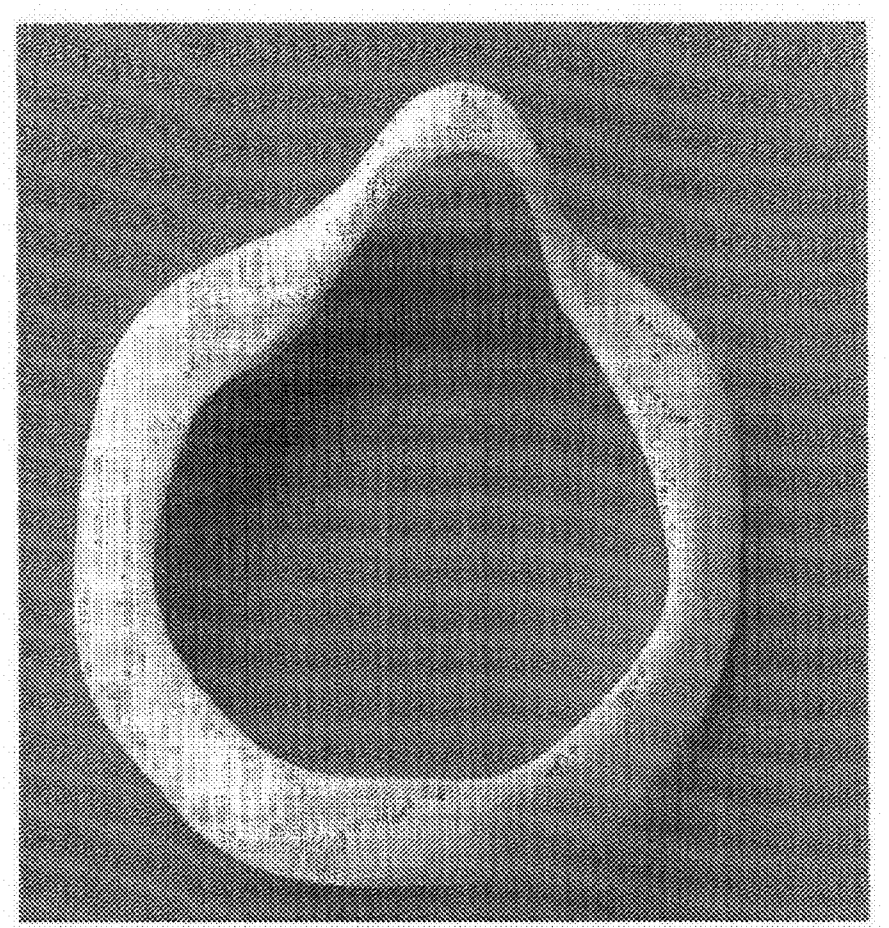
FIGS. 12A-12D illustrate example full face foam gaskets that benefit from systems and methods herein.
Figure 12C:
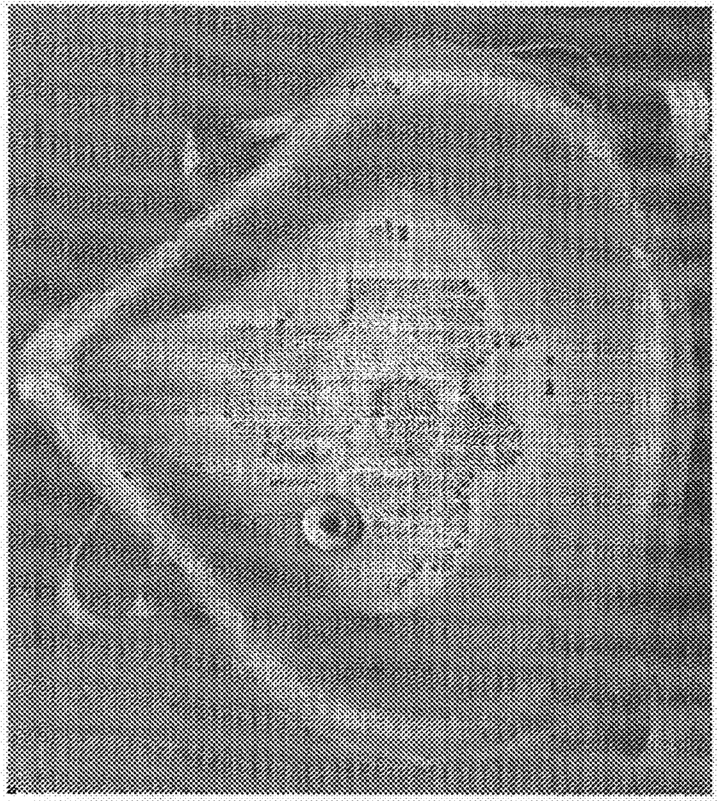
Figure 12B:
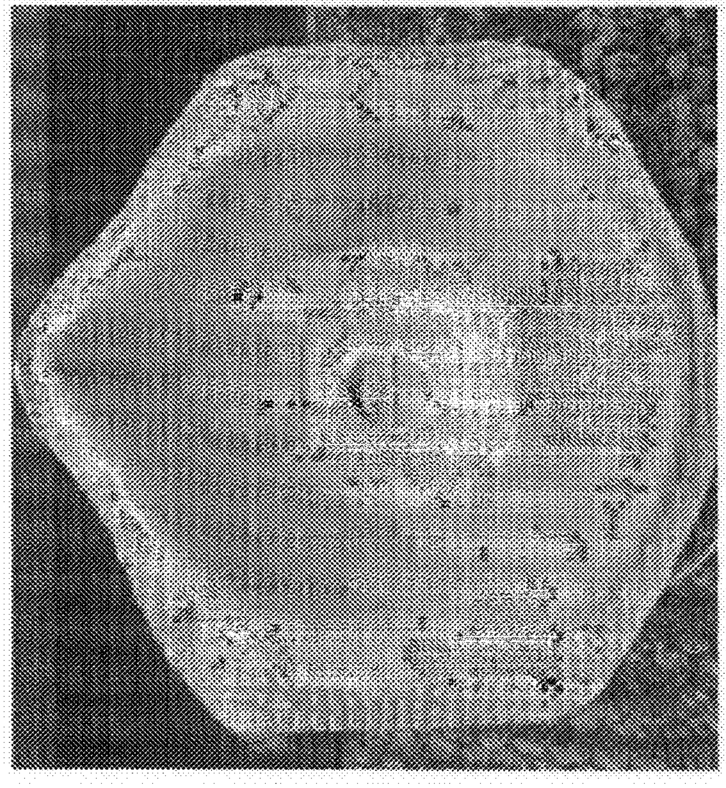
Figure 12D:
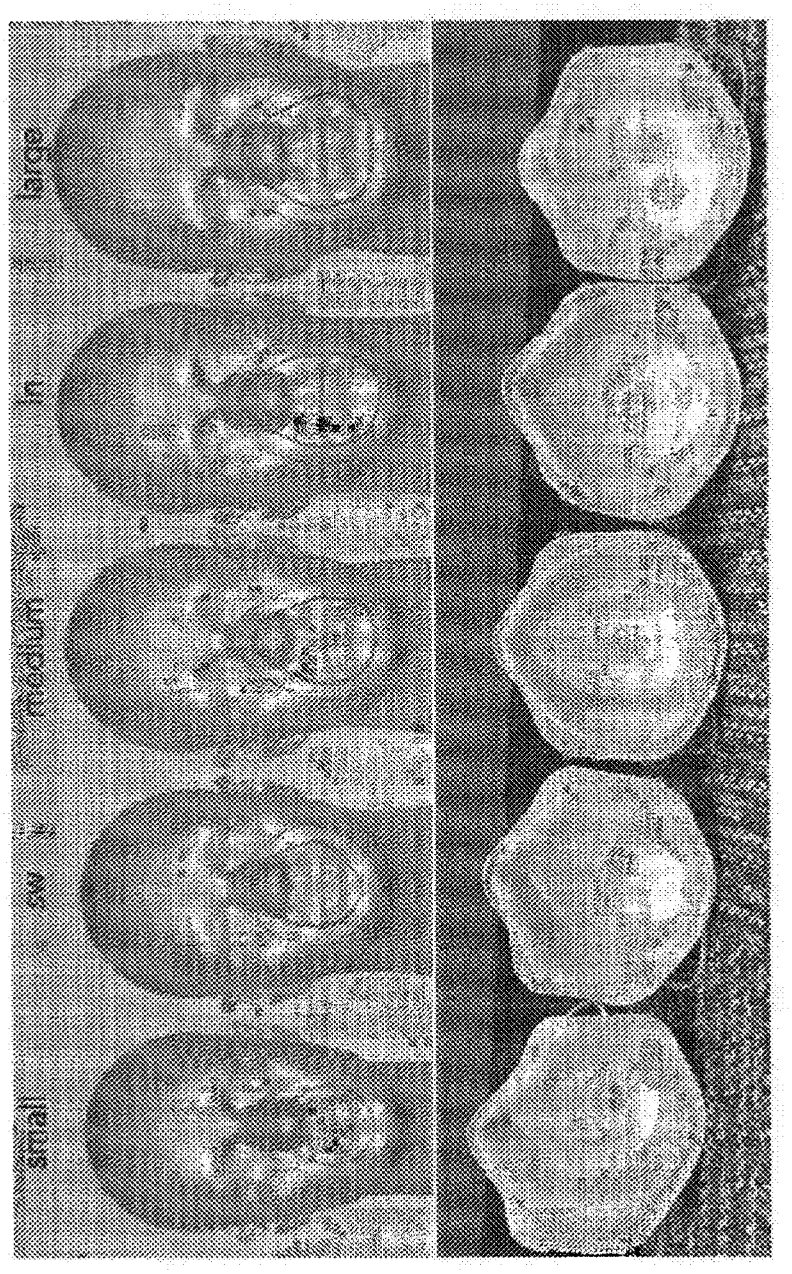

While the above description primarily concerns nose foams, similar concepts can be applied to form a gasket for the entire seal perimeter of a respiratory protection device. FIG. 12A illustrates a gasket for a respirator. FIG. 12B illustrates a foam gasket that is projected to provide an improved fit for 98% of the population of South Korea. FIG. 12C illustrates a gasket with an inwardly folded nose foam. FIG. 12D illustrates foam gaskets for the entire face seal thermoformed to fit the five different face shapes developed by NIOSH (National Institute of Occupational Safety and Health) to fit the US workforce as described in Zhuang et al. “Digital 3-D headforms with facial features representative of the current US workforce”, Ergonomics, 53: 5, 661-671, 2010. From left to right: Small, short/wide, medium, long/narrow and large.

Example 3: Flat Nose Foam and Contoured Nose Foam Fit Comparison

Vertical fold KN95 respirators (as shown in FIG. 3B) comprising flat rectangular nose foam were used as control. The example respirators were constructed by removing the flat rectangular foam and replacing it with sine-wave shaped contoured polyurethane foam (shown in FIG. 4A). All respirator samples were provided with 160 mm ear loops. Each sample respirator included an annealed aluminum nose clip that was 1 mm thick, 5 mm wide, and 90 mm long. A sample probe fixture (TSI, Inc.) was attached to each sample respirator so that the aerosol concentration inside the respirator could be determined during the face fit test. Twenty five Chinese human subjects that had a range of facial lengths and facial widths were selected. The measured facial length and width corresponds to the Chinese bivariant fit test panel as described by Chen et al. “New Respirator Fit Test Panels Representing the Current Chinese Civilian Workers” Ann. Occup. Hyg., Vol. 53, No. 3, pp. 297-305, 2009.

A face fit test was employed to determine the amount of leakage between a respirator user’s face and the seal structure of the respirator. The amount of face seal leakage between a respirator and a user’s face can be quantified by measuring the concentration of a test aerosol (e.g. NaCl particles suspended in air) on the inside and outside of a respirator. A useful face fit test has been developed, which selectively detects particles of 60 nanometers (nm) or smaller. See U.S. Pat. No. 6,125,845 Halvorson et al.

Face fit tests were conducted in a test chamber that was ventilated with filtered air. A NaCl aerosol where the particles had an approximate count median diameter of 50 nm was generated using a Model 9306 6-jet Atomizer (TSI Inc.) containing 2% NaCl in distilled water. The atomizer was adjusted so that a reading of between 1,500 and 5,000 particles/cc could be obtained with a fit test system composed of a PortaCount™ Plus with N95-Companion (TSI Inc.) in the “count mode”.

For each fit test, the subject donned the respirator, entered the test chamber and attached the respirator to the fit test system via the sample probe and a hose. The subject then performed the exercises defined in US Code of Federal Regulations 29 CRF 1910.134, Appendix A, Part I.A. a4(b). During these exercises, particle concentration data were collected from the fit test system. A fit factor was calculated for each exercise.

Fit factor is equal to the chamber aerosol concentration divided by the internal respirator aerosol concentration.

An average fit factor for each subject with each sample respirator was obtained by calculating the harmonic mean of the fit factors for each exercise.

A fit factor pass criteria were designated to be at the 65% of the test subjects. For control respirator sample 60% of the panel subjects achieved fit factor equal or greater to 100, while for the example contoured nose foam respirator sample 90% of the panel subjects achieved fit factor greater or equal to 100. The significant improvement in fit factor indicates improved fit achieved by subjects wearing respirator with contoured nose foam.

Example 4: Nose Foam Fit Analysis

An analysis was done to determine the relative fit of different nose foams for different individuals. FIGS. 13A-13D illustrate deidentified facial forms of a first individual, a Caucasian male. FIGS. 14A-14D illustrate facial forms of a second individual, a Caucasian female. Facial forms of the first and second individuals have different topography, as illustrated in the different figures. As a result, they may benefit from using different shaped nose forms.

Figure 13A:
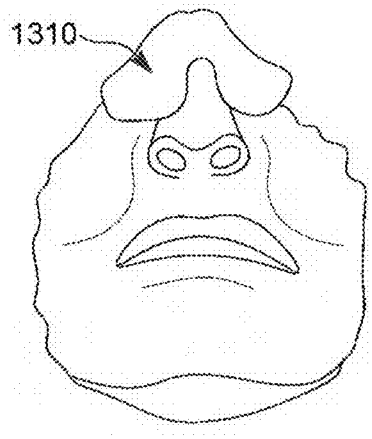
FIGS. 13-15 illustrate example nose foams on potential users.

FIG. 13A illustrates a nose foam 1310. Nose bridge is too wide to comfortably wear this foam. This foam is not recommended, and would be suggested fourth of the illustrated four options.

Figure 13B:
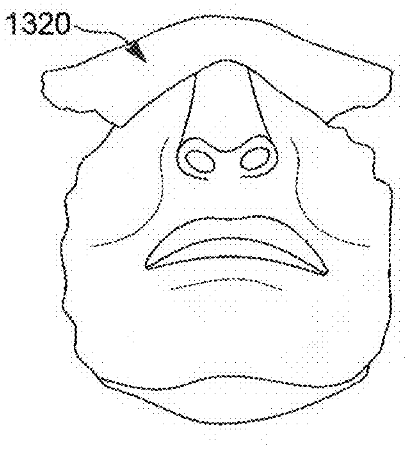

FIG. 13B illustrates a nose foam 1320. The user’s cheek slope would work well for this foam size, and it is expected to be a good fit. Of the four illustrated options, this is the second-best option.

Figure 13C:
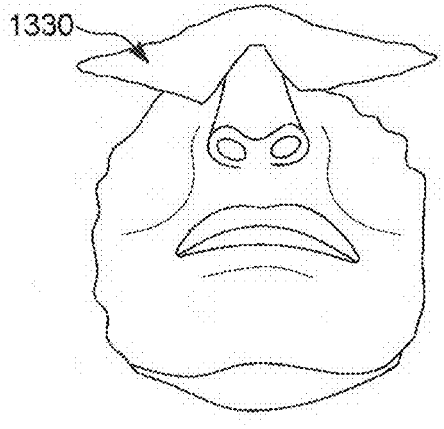

FIG. 13C illustrates a nose foam 1330. The nose bridge size matches the foam size: and this would be a comfortable fit for the user. This is the best option of the four illustrated nose foams and should be suggested first.

Figure 13D:
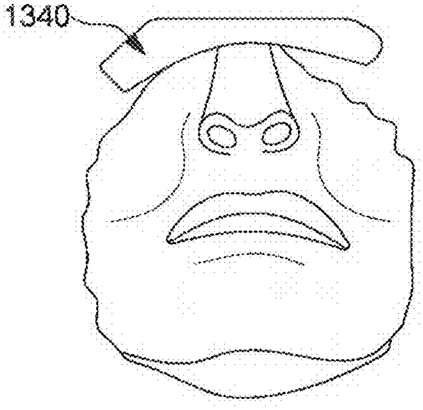

FIG. 13D illustrates a nose foam 1340. The nose bridge size would work okay for this foam size and the user could probably wear this foam, but it is not as good a fit as 1330 or 1320.

The same nose foams were then applied to the second individual, as illustrated in FIGS. 14A-14D.

Figure 14A:
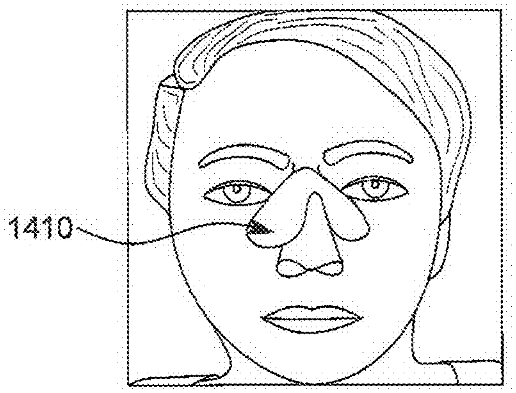

FIG. 14A illustrates a nose foam 1410. The nose bridge is too wide to comfortably wear this foam, and it has the worst fit of the four. It should be either not suggested or suggested fourth of the four options.

Figure 14B:
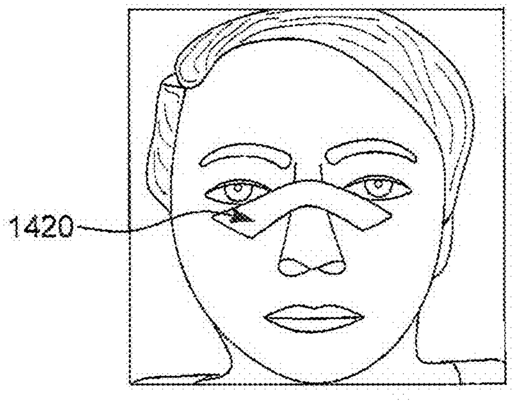

FIG. 14B illustrates a nose foam 1420. The user’s nose bridge is too flat for this foam to be useful, however it is expected to work better than nose foam 1420.

Figure 14C:
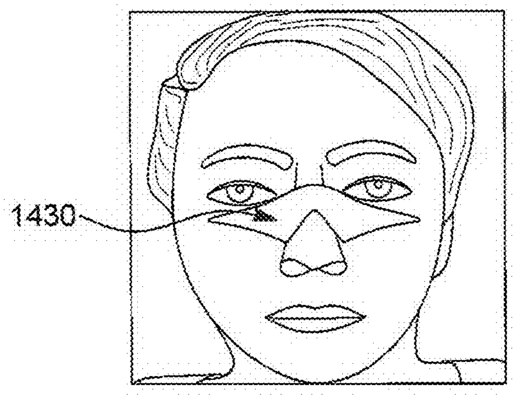

FIG. 14C illustrates a nose foam 1430. The nose bridge size matches the foam size: and the user could comfortably wear this foam. This is the best of the four proposed nose foams for this user, and should be suggested first.

Figure 14D:
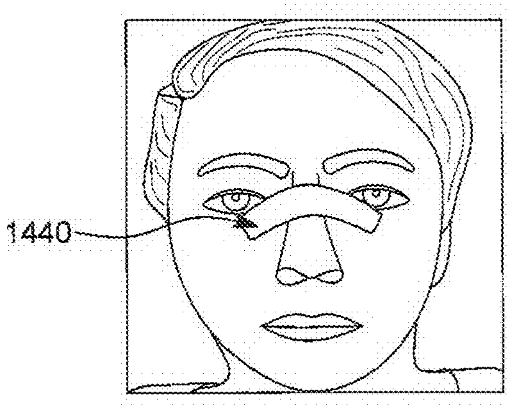

FIG. 14D illustrates a nose foam 1440. The nose bridge size would work okay for this foam size, and the user could probably wear this foam comfortably. This foam should be suggested second.

Example 5

Figure 15A:
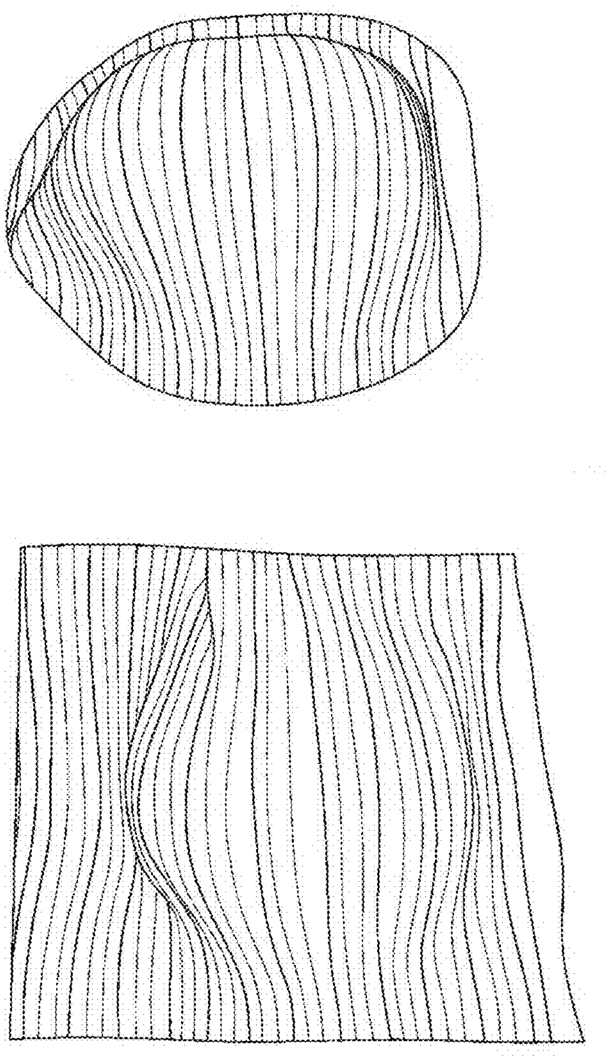

A corrugated web with three bonds per inch was made as described in example 2 of WO2016/069342. Blue dye was added to the piped olefin filament to improve visibility. The cup shaped filter is shown in FIG. 15A.

Example 6

Figure 15B:
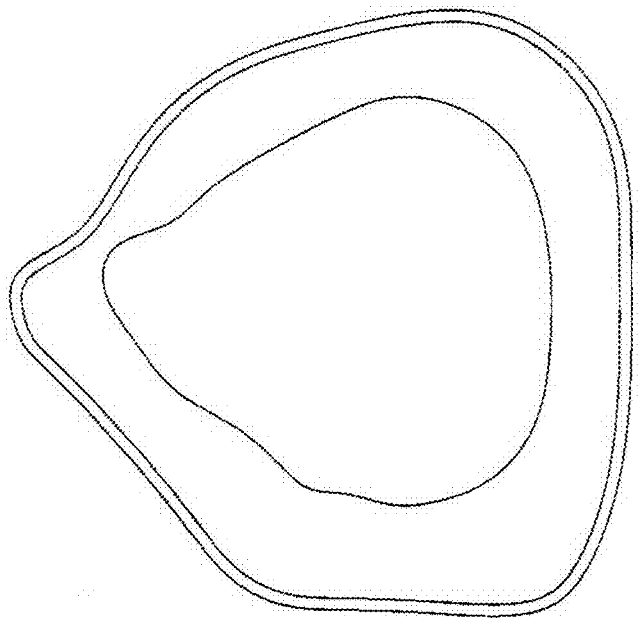
Figure 15D:
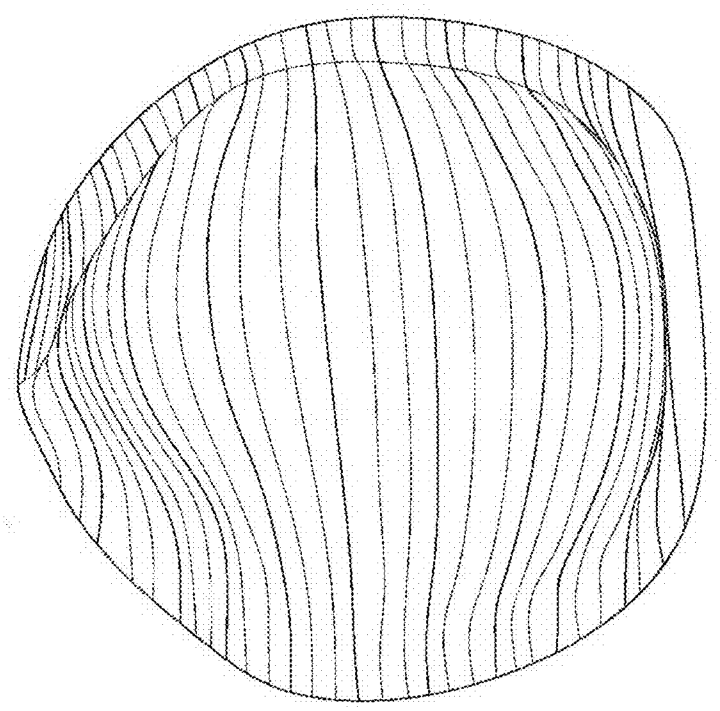
Figure 15C:
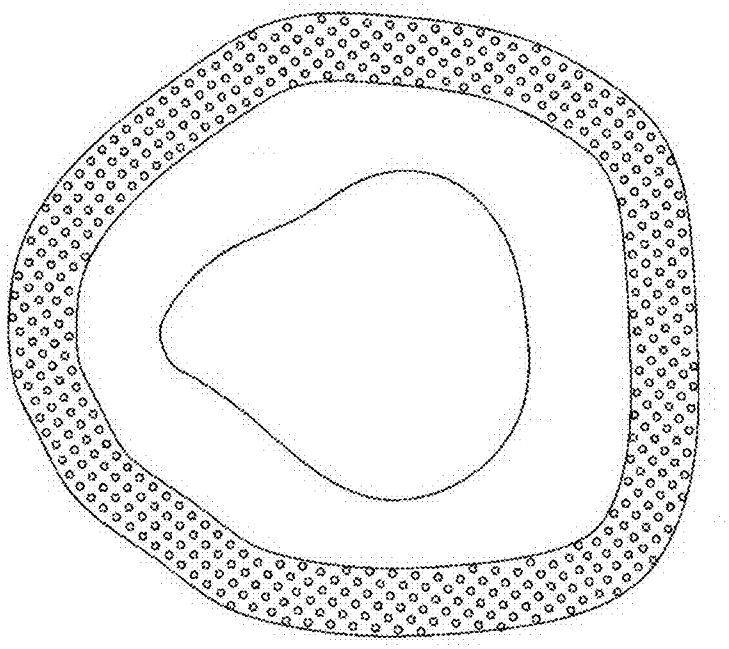

Commercially available olefin foams (cross-linked polyethylene foam) sold under the trade name Volara Type A sold by Sekisui Voltek, LLC (Laurence, MA) was used to generate working prototypes. The foam was thermoformed around the 3D printed gasket shown in FIG. 15B. The thermoformed foam was trimmed to create a respirator seal, which was ultrasonically welded to the corrugated web shown in FIG. 15A. The resulting respirator is shown in FIGS. 15C-5D.

Example 7

Fit testing was conducted with three subjects using prototypes made as described in Example 6. 3M 8211 respirator with PVC foam face seal was used as control for fit testing experiments.

Fit factor greater or equal to 100 was obtained with all three test subjects. The fit factor data for the respirator of this invention which does not have a nose clip or nose foam was comparable to the control respirator.

What is claimed is:

1. A method of making a filtering facepiece respirator, the method comprising:
- scanning a face of a user of the filtering facepiece respirator;
- detecting a facial contour;
- forming a face-covering portion from a first olefin material;
- forming a custom gasket from a second olefin material, wherein the custom gasket is customized based on a known facial feature of a user, wherein the custom gasket is formed based on the detected facial contour;
- coupling the custom gasket to the face-covering portion using a metal-free coupling;
- attaching a tightening element to the face-covering portion or the custom gasket; and
- wherein the filtering facepiece respirator is metal free.

2. The method of claim 1, wherein coupling comprises ultrasonic welding, adhesive, or melting.

3. The method of claim 1, wherein the face-covered portion comprises a thermoformed olefin-based material.

4. The method of claim 1, wherein the custom gasket comprises an olefin foam.

5. The method of claim 1, wherein the custom gasket is selected from a plurality of template gaskets based on a scan of a face.

6. The method of claim 1, wherein the custom gasket is selected from one of a plurality of templates based on a best fit analysis of the scan.

7. A method of providing a nose foam for a respiratory protection device, the method comprising:
- scanning a face of a wearer using one or more imaging scans to obtain facial data, wherein the facial data comprises at least one contour of a nose area of the wearer;
- analyzing the facial data to detect a facial feature corresponding to the nose area;
- recommending, based on the detected facial feature, at least one nose foam template from a plurality of available nose foam templates or generating a custom nose foam template; and
- providing instructions for applying the recommended or generated nose foam template to the respiratory protection device for sealing between the wearer's face and the respiratory protection device, wherein the nose foam template is configured to cover the bridge of the wearer's nose and provide a seal between the respiratory protection device and the wearer's face.

8. The method of claim 7, wherein scanning the face of the wearer comprises capturing three-dimensional depth data using a LIDAR or structured-light scanning system.

9. The method of claim 7, further comprising generating a custom nose foam template by cutting a foam sheet based on the detected facial feature of the wearer.

10. The method of claim 7, wherein providing instructions for applying the nose foam template comprises displaying an augmented reality overlay of the wearer's scanned face and an indication of where the nose foam template should be placed.

11. The method of claim 7, further comprising receiving a wearer preference that includes at least one of foam density or foam color, and basing the recommending at least in part on the wearer preference.

12. The method of claim 7, wherein the instructions include using a mobile application to guide alignment of the nose foam template on the respiratory protection device.

13. The method of claim 7, further comprising, after the nose foam template is applied, performing a fit test that measures a particle concentration inside and outside the respiratory protection device to confirm a seal for the wearer.

14. The method of claim 7, further comprising:
- forming a face-covering portion from a first olefin material;
- forming a custom gasket from a second olefin material, wherein the custom gasket is based on at least one known facial feature of the wearer in addition to the at least one contour of the nose area;
- coupling the custom gasket to the face-covering portion using a metal-free coupling;
- attaching a tightening element to the face-covering portion or the custom gasket; and
- wherein the resulting filtering facepiece respirator is metal free.

15. A kit for sealing a nose area of a respiratory protection device, the kit comprising:
- a plurality of nose foam templates, each of the plurality of nose foam templates having a different contour configured to contact the nose area of a wearer;
- a mobile application stored on at least one non-transitory computer-readable medium, wherein the mobile application is configured to:
  - receive image data or scanning data from a camera associated with a computing device;
  - detect a nose-related facial feature of the wearer based on the received data;
  - recommend which nose foam template from the plurality of nose foam templates corresponds to the detected nose-related facial feature; and
  - display instructions for attaching the recommended nose foam template to the respiratory protection device; and
- at least one attachment component configured to couple the recommended nose foam template to the respiratory protection device,
- wherein the kit is configured to facilitate sealing of the nose area of the wearer.

16. The kit of claim 15, wherein the mobile application is further configured to store multiple facial scans and recommendations so that multiple wearers can select nose foam templates from the same kit.

17. The kit of claim 15, wherein the mobile application prompts the wearer to position a fiducial marker on or near the wearer's face in order to calibrate the scanning data.

18. The kit of claim 15, wherein the plurality of nose foam templates each has a contour selected from a set of dimensional classes generated by grouping prior facial scans into clusters.

19. The kit of claim 15, wherein the mobile application is further configured to capture three-dimensional depth data from a structured-light or LIDAR sensor and analyze the depth data to detect the nose-related facial feature.

20. The kit of claim 15, wherein the mobile application is configured to provide an augmented reality overlay, on a live camera feed of the wearer's face, showing a visual guide for placement of the recommended nose foam template.

* * * * *